(12) United States Patent
Yue et al.

(10) Patent No.: US 10,341,608 B2
(45) Date of Patent: Jul. 2, 2019

(54) COMMUNICATION SYSTEM AND COMMUNICATION METHOD

(71) Applicant: NEC NETWORKS & SYSTEM INTEGRATION CORPORATION, Tokyo (JP)

(72) Inventors: Akifumi Yue, Tokyo (JP); Norihiko Fujioka, Tokyo (JP); Osamu Kikuchi, Tokyo (JP); Yukiko Einaga, Tokyo (JP); Tomonori Kaizaki, Tokyo (JP); Ken Mitsudo, Tokyo (JP); Yumi Sugiura, Tokyo (JP); Tsukasa Nagase, Tokyo (JP); Satoshi Kobayashi, Tokyo (JP)

(73) Assignee: NEC NETWORKS & SYSTEM INTEGRATION CORPORATION (JP)

( * ) Notice: Subject to any disclaimer, the term of this patent is extended or adjusted under 35 U.S.C. 154(b) by 0 days.

(21) Appl. No.: 15/740,292

(22) PCT Filed: Jun. 3, 2016

(86) PCT No.: PCT/JP2016/066575
§ 371 (c)(1),
(2) Date: Dec. 27, 2017

(87) PCT Pub. No.: WO2017/002530
PCT Pub. Date: Jan. 5, 2017

(65) Prior Publication Data
US 2018/0184044 A1 Jun. 28, 2018

(30) Foreign Application Priority Data
Jun. 30, 2015 (JP) .................... 2015-132259

(51) Int. Cl.
*H04N 7/14* (2006.01)
*H04N 7/15* (2006.01)
*G06T 7/20* (2017.01)

(52) U.S. Cl.
CPC ............... *H04N 7/142* (2013.01); *G06T 7/20* (2013.01); *H04N 7/147* (2013.01); *H04N 7/15* (2013.01)

(58) Field of Classification Search
None
See application file for complete search history.

(56) References Cited

U.S. PATENT DOCUMENTS 7,692,680 B2 * 4/2010 Graham ................. H04N 7/15
348/14.01
2004/0095460 A1 5/2004 Buchner et al.
(Continued)

FOREIGN PATENT DOCUMENTS

JP H10-285567 A 10/1998
JP 2004-520736 A 7/2004
(Continued)

OTHER PUBLICATIONS

International Search Report (in English and Japanese) issued in PCT/JP2016/066575, dated Aug. 30, 2016; ISA/JP.

*Primary Examiner* — Maria El-Zoobi
(74) *Attorney, Agent, or Firm* — Harness, Dickey & Pierce, P.L.C.

(57) ABSTRACT

A communication system induces communication between different base sites, which includes a video display unit disposed by corresponding to a flow line set on a floor face of a first base site out of the different base sites, and an imaging device which captures a state of a second base site out of the different base sites. The flow line is a route along which persons go back and forth on the floor face of the base site and the video display unit displays the video captured by (Continued)

the imaging device to transmit the state within the second base site as video information toward the corresponding flow line side of the first base site.

13 Claims, 18 Drawing Sheets

(56) References Cited

U.S. PATENT DOCUMENTS

| 2013/0328777 | A1* | 12/2013 | Johnson | H04N 13/361 |
| | | | | 345/161 |
| 2015/0312520 | A1* | 10/2015 | Nohria | G09B 5/06 |
| | | | | 434/350 |

FOREIGN PATENT DOCUMENTS

| JP | 2007-067972 A | 3/2007 |
| JP | 2009-081861 A | 4/2009 |
| JP | 2011-188112 A | 9/2011 |
| JP | 2012-034020 A | 2/2012 |

\* cited by examiner

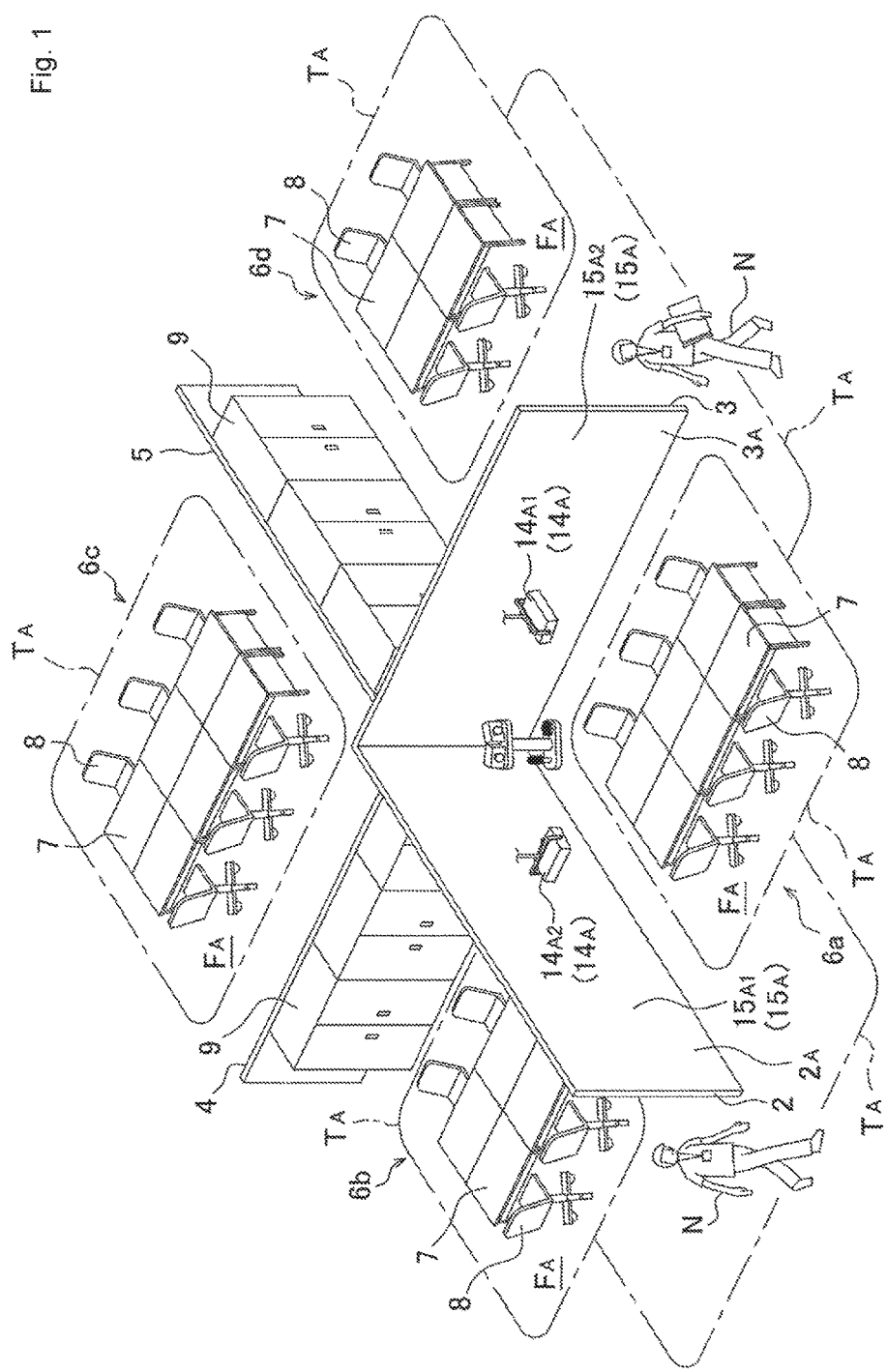

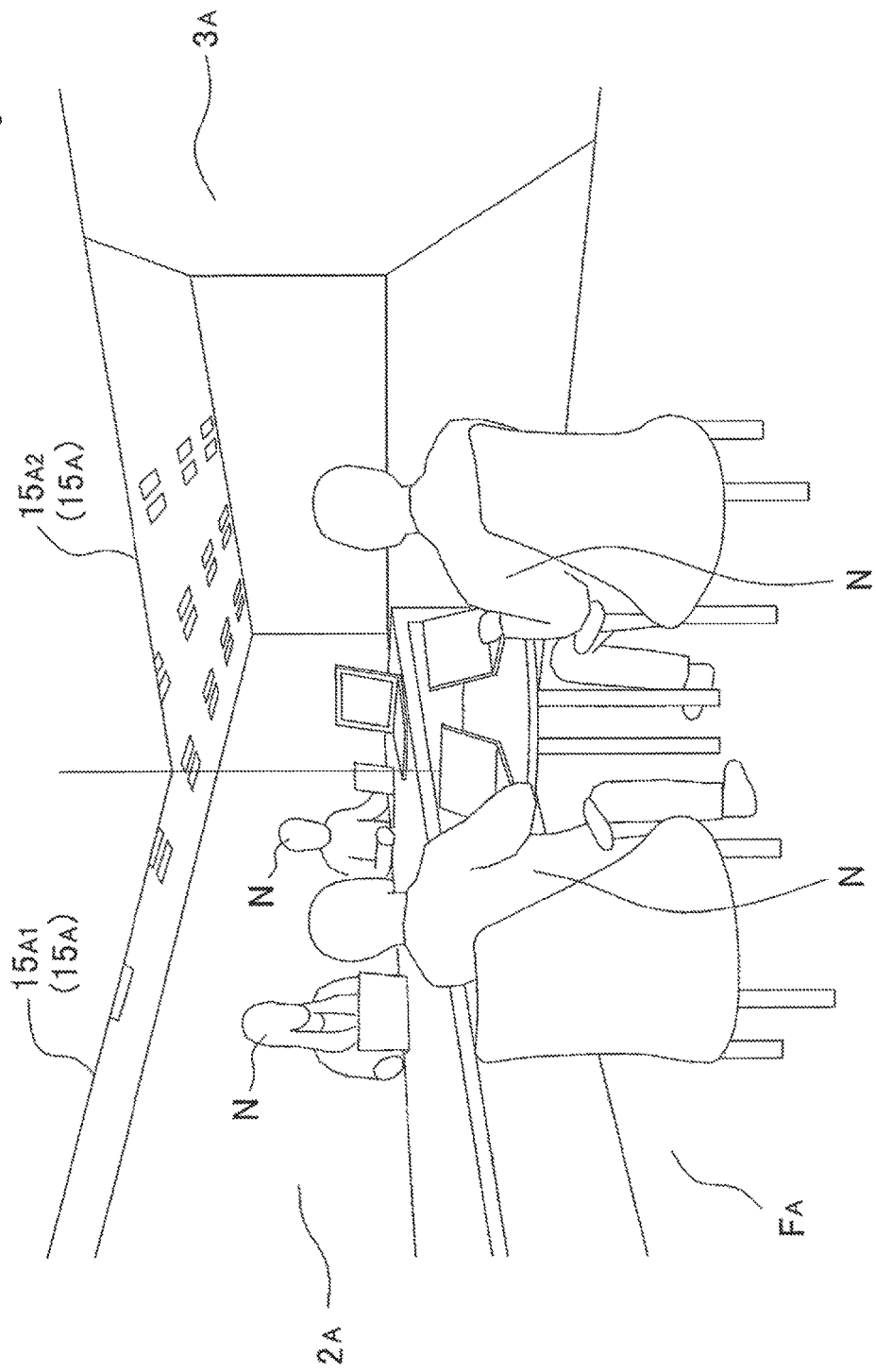

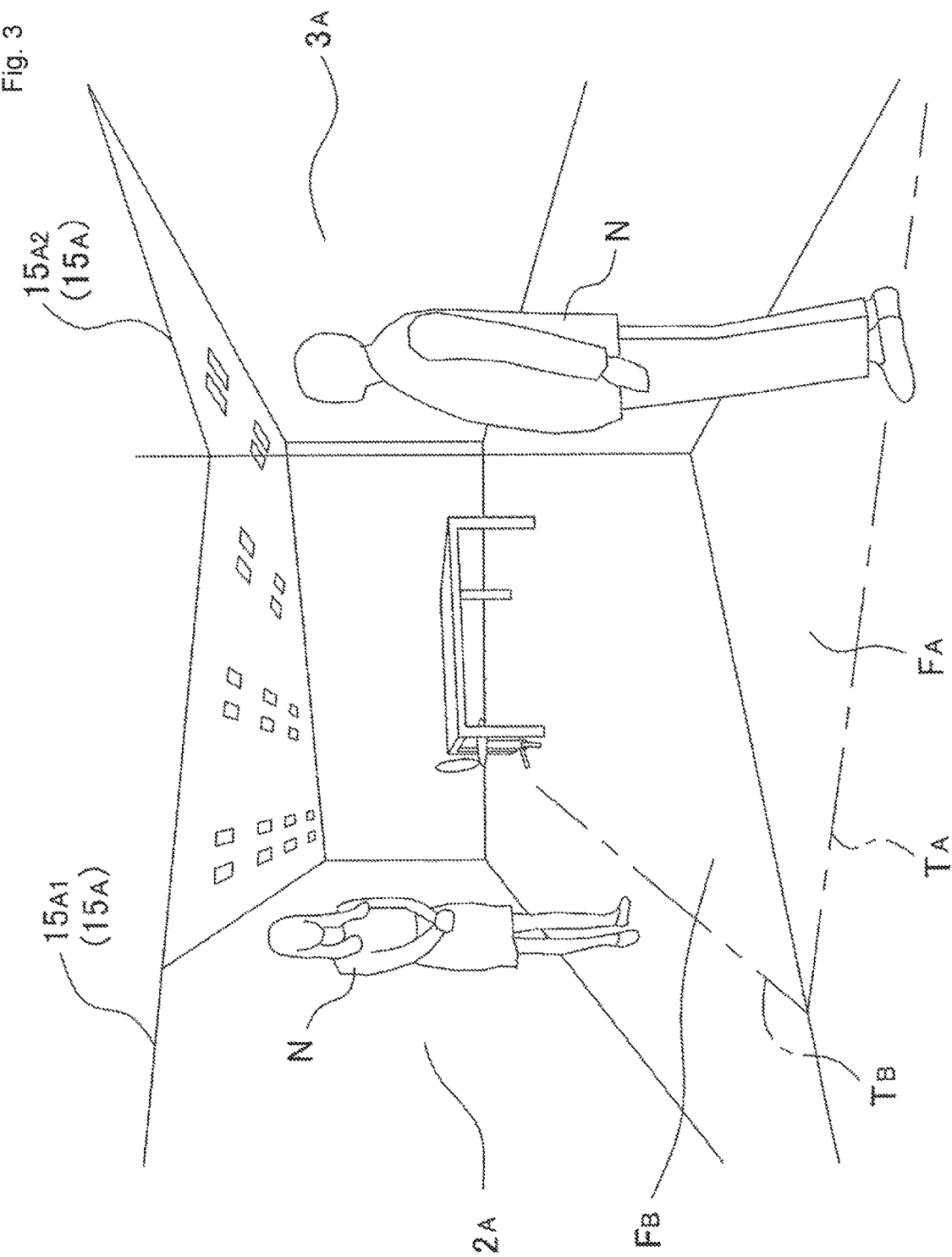

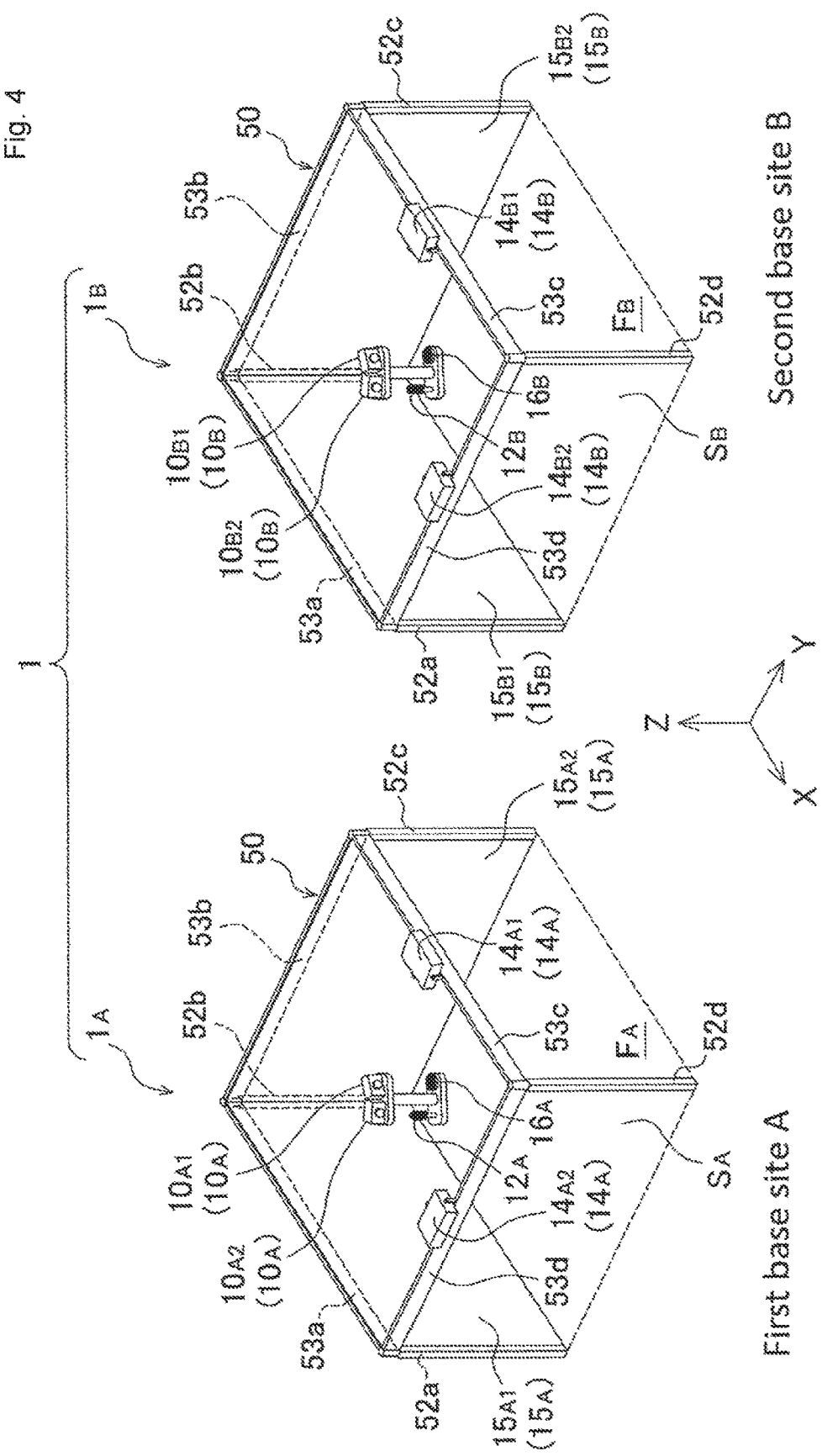

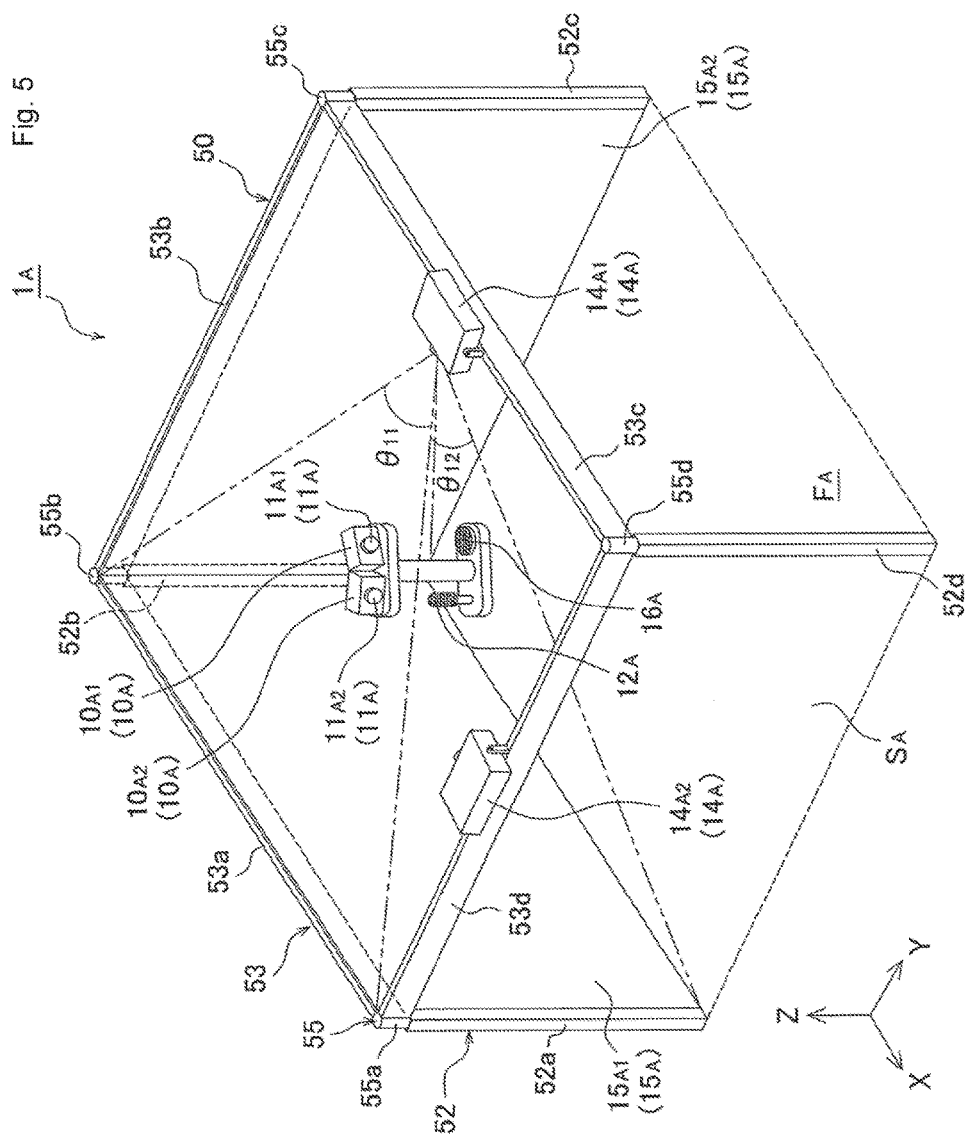

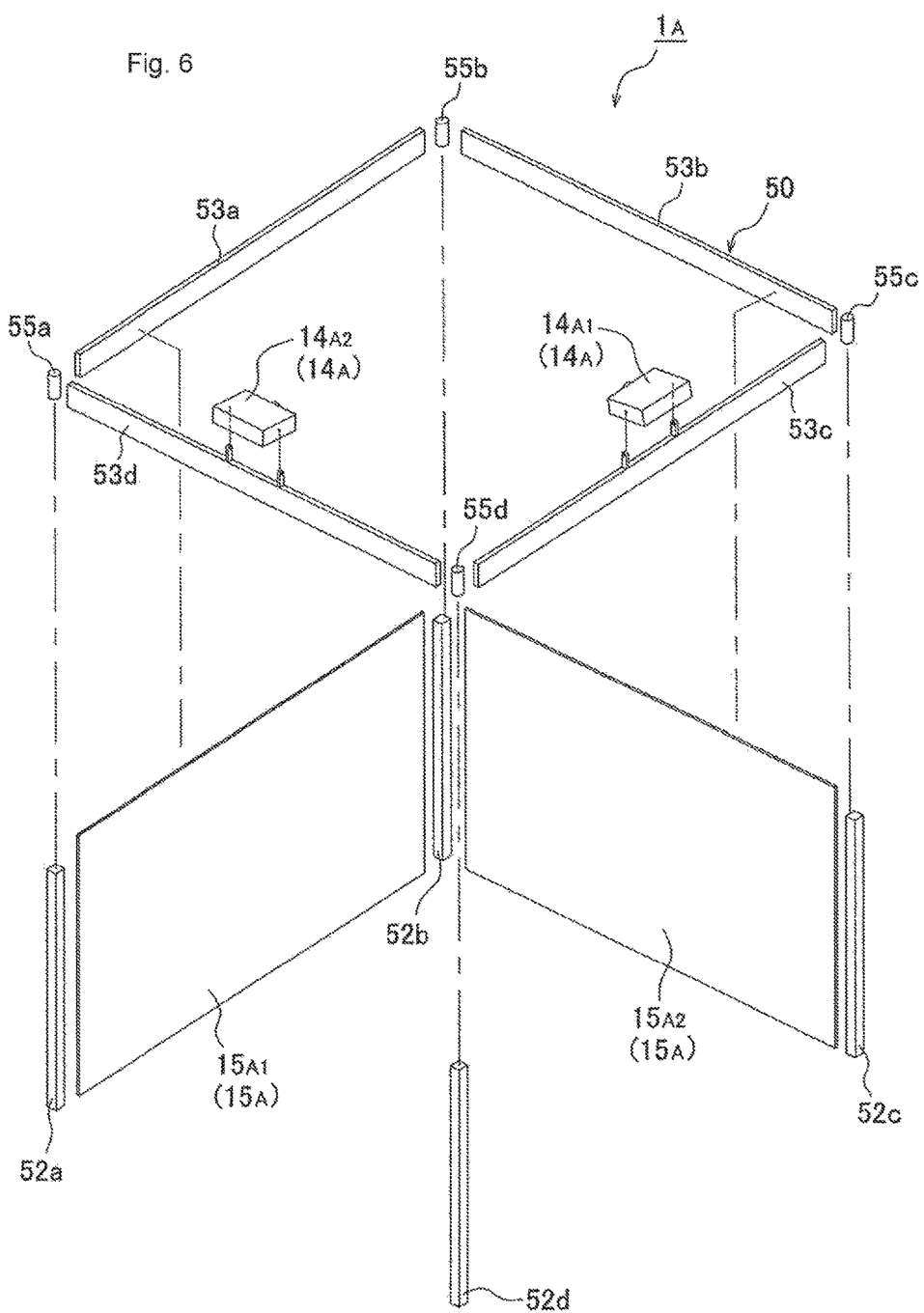

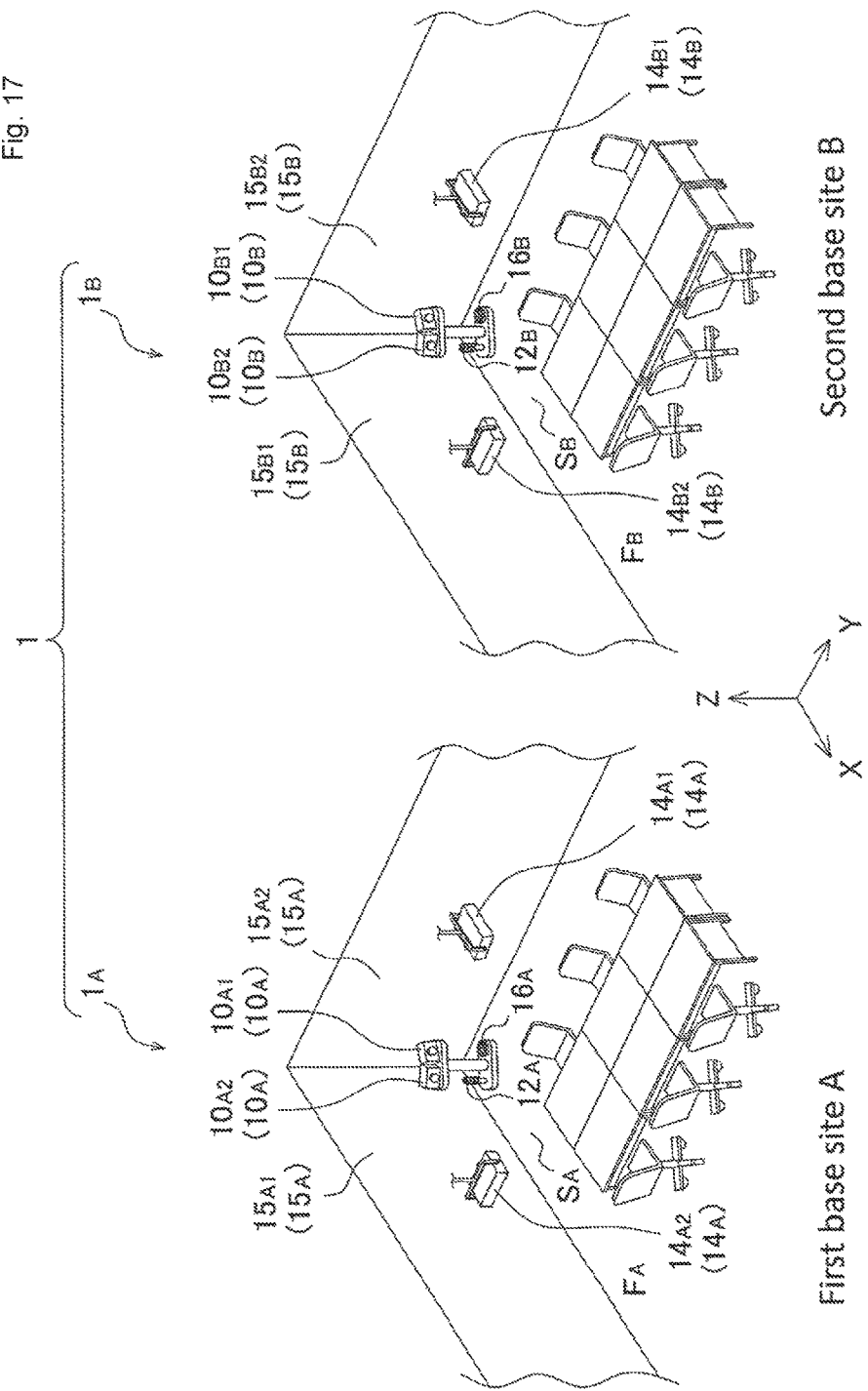

COMMUNICATION SYSTEM AND COMMUNICATION METHOD

CROSS-REFERENCE TO RELATED APPLICATIONS

This application is a U.S. National Stage Application of International Application No. PCT/JP2016/066575, filed on Jun. 3, 2016, and published in Japanese as WO 2017/002530 A1 on Jan. 5, 2017 and claims priority to Japanese Application No. 2015-132259, filed on Jun. 30, 2015. The entire disclosures of the above applications are incorporated herein by reference.

BACKGROUND OF THE INVENTION

Technical Field

The present invention relates to a communication system and a communication method and, more specifically, to a communication system and a communication method capable of achieving such a state as if a space and another space were being linked through providing lifelike and realistic videos on a flow line along which persons move.

Background Art

Recently, due to globalization and broader-area corporate activities, offices (work places) may exist in various scattered regions or the offices (workplaces) may be located over a plurality of floors depending on conditions of rented office buildings, for example, which may cause lack of communication required between staff members for carrying out business duties. This may result in having troubles in the business duties in some cases.

Especially, lack of "face-to-face" communication with which persons communicate with each other face to face is considered a loss of opportunity for creating new imagination. It is considered so because of such experiences that new imagination is created more from casual conversations chatted within office spaces than from a meeting with a specific subject of discussion and that an environment where many concerned persons can share a single space and collaborate with each other is an important element for creating new imagination.

As a way of sharing a single space, communication using a Web Conference System and Teleconference System (Japanese Patent Laid Open Publication No. 2009-81861) has been proposed.

However, the web conference system and the teleconference system are ways of communication connected by setting time and places, and it is the fact that a sense of sharing a whole space and being together cannot be brought out yet. That is, there is still a sense of distance felt between concerned persons within a single space. Therefore, induction of new ideas and promotion of intellectual creations such as innovations cannot be expected.

An object of the present invention is to provide a communication system and a communication method capable of bringing out latent potentiality generated from combined effects of persons through linking spaces by eliminating a sense of distance existing between concerned parsons of the web conference system and the teleconference system for allowing the whole spaces to be shared.

SUMMARY OF THE INVENTION

In order to achieve the foregoing object, a communication system according to the present invention is a communication system for inducing communication between different base sites, which includes a video display unit disposed by corresponding to a flow line set on a floor face of a first base site out of the different base sites, and an imaging device which captures a state of a second base site out of the different base sites, in which: the flow line is a route along which a person goes back and forth on the floor face of the base site; and the video display unit displays the video captured by the imaging device to transmit the state within the second base site as video information toward the corresponding flow line side of the first base site.

The imaging device captures the state of the second base site including move of the person in addition to a flow line set on a floor face of the second base site.

The video display unit is formed with a surface-like member including a display face, and the video is displayed on the video display unit by linking the flow line of the second base site to the flow line of the first base site.

The video display unit is placed with its lower end close to or abutting against the floor face of the first base site, and the video of the floor face of the second space is displayed on the lower end side of the video display unit out of the video of the second base site captured by the imaging device.

The imaging device captures a prescribed space including at least a part of a ceiling of the second base site and outputs the video; an upper end of the video display unit is close to or abuts against a ceiling of the first base site; and the video of the ceiling of the second base site is displayed on the upper end side of the video display unit out of the video of the second base site captured by the imaging device.

The video display unit is set at a height where the wall face of the first base site is not caught in a view field of a viewer standing toward the video display unit between the upper end of the video display unit and the ceiling of the first base site.

The video display unit is formed in a range covering a viewing angle of a viewer who sees the video displayed on the video display unit.

In the video display unit, a plurality of the surface-like members are combined so that display faces of the surface-like members exist over the flow line side of the first base site and an inner region from the flow line side of the first base site, and a life-size video is displayed on the display face of a center region thereof.

The communication system further includes at least either an audio device which collects sounds of the first base site and outputs the sounds to the second base site or an audio device which collects sounds of the second base site and outputs the sounds to the first base site.

The imaging device successively captures the state of the second base site; and the video display unit displays the video captured by the imaging device to successively transmit the state of the second base site as the video information.

Further, a communication system according to the present invention is a communication system for inducing communication between different base sites, in which: a flow line of a route along which a person goes back and forth is set on each floor face of the different base sites; an imaging device captures a state of a second base site including move of the person in addition to the flow line set on the floor face of the second base site out of the different base sites; and the video captured by the imaging device is displayed to transmit the state within the first base site as video information in the first base site.

A communication method according to the present invention is a communication method for inducing communication between different base sites, which includes: setting a flow line of a route along which a person goes back and forth on each floor face of the different base sites; capturing a state of a second base site out of the different base sites by using an imaging device; and displaying the video captured by the imaging device on a video display unit disposed by corresponding to the flow line within the first base site out of the different base sites to transmit, by the video display unit, the state within the second base site as video information toward the corresponding flow line side of the first base site.

The imaging device captures the state of the second base site including move of the person in addition to the flow line set on the floor face of the second base site.

A surface-like member including a display face is used as the video display unit, and the video is displayed on the display face of the surface-like member by linking the flow line of the second base site to the flow line of the first base site.

Further, a communication method according to the present invention is a communication method for inducing communication between different base sites, which includes: setting a flow line of a route along which a person goes back and forth on each floor face of the different base sites; capturing a state of a first base site out of the different base sites by using an imaging device; and displaying the video captured by the imaging device on a video display unit disposed by corresponding to the flow line within the second base site out of the different base sites to transmit, by the video display unit, the state within the first base site as video information toward the corresponding flow line side of the first base site.

Advantageous Effect of the Invention

According to the present invention described above, the imaging device captures the space having the flow line of the route along which the persons go back and forth being set on the floor face. When capturing videos with the imaging device, the imaging device captures the state of the second space including the move of the persons in addition to the flow line set within the second space out of the different spaces, and the videos captured by the imaging device are displayed on the video display unit of the first space out of the different spaces to transmit the state of the second space as video information. Thus, the other space is spread in front of the eyes, thereby providing a feeling that as if a person at distant was right next over the actual distance. This induces communication between the different spaces to stimulate communication with the distant office. Thereby, it is possible to induce new ideas and to promote intellectual creation such as innovation.

BRIEF DESCRIPTION OF THE DRAWINGS

FIG. 1 is a perspective view showing a configuration of a communication system according to an embodiment of the present invention;

FIG. 2 is an illustration for describing a state of inducing communication by using the communication system according to the embodiment of the present invention;

FIG. 3 is an illustration for describing another state of inducing communication by using the communication system according to the embodiment of the present invention;

FIG. 4 is an illustration showing a configuration of a case where the communication system according to the embodiment of the present invention is provided at a first base site and a second base site, respectively;

FIG. 5 is a perspective view showing an external appearance of the communication system according to the embodiment of the present invention;

FIG. 6 is an exploded perspective view of the communication system according to the embodiment of the present invention;

FIGS. 7A and 7B show a layout of display devices and video display units of the communication system according to the embodiment of the present invention, in which FIG. 7A is a schematic plan view of the layout and FIG. 7B is a schematic side view of the layout;

FIGS. 9A and 9B show a layout of the video display unit of the communication system according to the embodiment of the present invention, in which FIG. 9A is a view of the layout in the first base site and FIG. 9B is a view of the layout in the second base site;

FIGS. 10A and 10B show a layout of an imaging device of the communication system according to the embodiment of the present invention, in which FIG. 10A is a schematic plan view of the layout and FIG. 10B is a schematic side view of the layout;

FIGS. 12A and 12B show diagrams of data flows in the communication system according to the embodiment of the present invention, in which FIG. 12A shows data transmission/reception from the first base site to the second base site and FIG. 12B shows data transmission/reception from the second base site to the first base site;

FIG. 17 is an illustration showing a configuration of a case where the communication system according to the embodiment of the present invention is provided at the first base site and the second base site, respectively.

DETAILED DESCRIPTION OF THE PREFERRED EMBODIMENTS

Figure 7A:
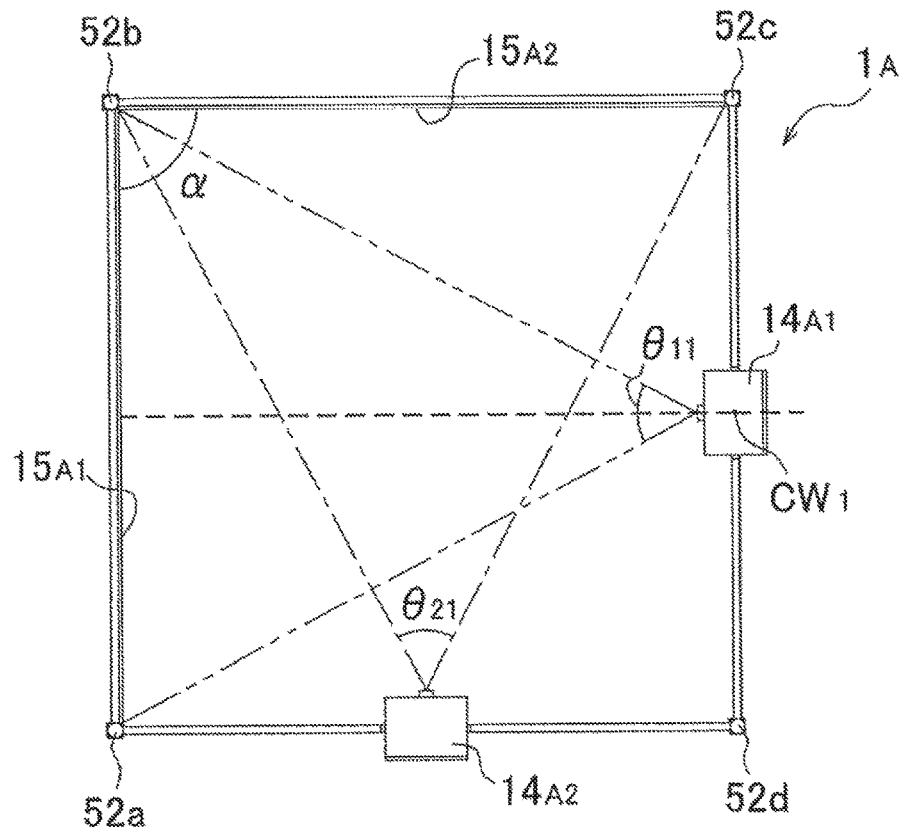

Hereinafter, an embodiment of the present invention will be described in details by referring to the accompanying drawings.

First, basic structures of a communication system according to an embodiment of the present invention will be described. Out of a first base site A and a second base site B as different base sites, FIG. 1 shows layout within the first base site. As shown in FIG. 1, in a case where the first base site A is an office, the inside thereof (base site A) is partitioned by panels 2, 3, 4, and 5 into divisions $6_a$, $6_b$, $6_c$, and $6_d$ as a unit, and a plurality of sets of desks 7 and chairs 8 are placed in the spaces of those divisions $6_a$, $6_b$, $6_c$, and $6_d$. Further, on a floor face $F_A$ inside each of the divisions $6_a$, $6_b$, $6_c$, and $6_d$, a flow line $T_A$ as a route along which a person N goes back and forth efficiently is set. Similarly, the flow line $T_A$ is also set on the floor faces $F_A$ between each of the divisions $6_a$, $6_b$, $6_c$, and $6_d$ for allowing the person N to go back and forth efficiently between each of the divisions $6_a$, $6_b$, $6_c$, and $6_d$.

In the case of the layout of the office shown in FIG. 1, an area along the panels 4 and 5 may be utilized as a space for housing fixtures 9 because the height of the panels 4 and 5 corresponds to the height of the fixtures 9, for example. Meanwhile, the panels 2 and 3 may be used only as the partitions. In the second base site B shown in FIGS. 3 and 4, a flow line $T_B$ is set on the floor face $F_A$ of the second base site B as in the case of the layout in the first base site A.

In the embodiment of the present invention, the communication system is built by disposing a video display unit $15_A$ and an imaging device $10_A$ with the panels 2, 3 being the center considering that the panels 2, 3 shown in FIG. 1 exist along the flow line $T_A$.

Hereinafter, the communication system according to a first embodiment of the present invention will be described. As shown in FIG. 1, in the communication system according to the embodiment of the present invention, the video display unit $15_A$ is formed with the panels 2 and 3. The panels 2 and 3 configuring the video display unit $15_A$ shown in FIG. 1 are screens, and videos from a display device $14_A$ are displayed on panel surfaces $2_A$, $3_A$ of the panels 2, 3 as the screens. When displaying videos, the panel surfaces $2_A$, $3_A$ of the panels 2, 3 as the screens function as the display faces ($2_A$, $3_A$) of the video display unit $15_A$. The panels 2, 3 are surface-like members as display media disposed by being stood up from the floor face $F_A$ toward the ceiling, and the video display unit $15_A$ is formed with the panels 2, 3 as the surface-like members (display media).

While the panels 2 and 3 are used as the surface-like members (display media) in FIG. 1, the surface-like members are not limited only to those. Other than the panels 2, 3, inner walls of a building where videos from the display device $14_A$ are displayed on surfaces thereof may be used as the surface-like members, for example. Even in such case where the inner wall surfaces are the screens, the inner walls of the building are the surface-like members, and the inner walls of the building are used as the surface-like members, the video display unit $15_A$ is formed with the surface-like members (display media). In the case where the panels 2, 3 or the inner wall surfaces of the building are used as the screens, not only the whole surfaces of those may be used as the screen but also a part of those surfaces may be used as the screen. Further, the screen may be disposed in front of the panels, the inner walls surfaces of the building, or the like. In that case, the screen in the front of the panels, the inner wall surfaces of the building, or the like forms the surface-like member, and the video display unit $15_A$ is formed with the surface-like member.

Further, while the video display unit $15_A$ is a structure where videos from the display device $14_A$ are displayed on the display faces ($2_A$, $3_A$) thereof, the display unit is not limited only to such structure.

A digital display such as a liquid crystal display may be used instead of the screen. In such case, the display face of the digital display functions as a surface-like member as a display medium, and the video display unit $15_A$ is formed with the surface-like member (display medium) configured with the digital display.

Also, the digital display may be disposed in front of the display panel, the inner wall surface, or the like. The panel, the inner wall surface, or the like and the digital display form the surface-like member, and the video display unit $15_A$ is formed with the surface-like member.

Therefore, the video display unit $15_A$ may be configured to display the videos from the display device $14_A$ on the display faces ($2_A$, $3_A$) or may be configured to display videos self-luminously.

Further, in the example shown in FIG. 1, the video display unit $15_A$ is configured by combining a first video display unit $15_{A1}$ of a surface-like member including the display face ($2_A$) and a second video display unit $15_{A2}$ of a surface-like member including the display face ($3_A$). Since there are the first video display unit $15_{A1}$ and the second video display unit $15_{A2}$, a first display device $14_{A1}$ and a second display device $14_{A2}$ are provided as the display device $14_A$ for displaying videos on those video display units.

Next, videos displayed on the display faces ($2_A$, $3_A$) of the video display unit $15_A$ will be described. Assuming that the office shown in FIG. 1 is the base site A, the office shown in FIG. 4 is the second base site B. An imaging device $10_B$ is placed in the second base site B shown in FIG. 4. The imaging device $10_B$ includes two imaging devices $10_{B1}$, $10_{B2}$, captures the state inside the second base site B with those imaging devices $10_{B1}$, $10_{B2}$, and transmits the videos thereof to the display device $14_A$ of the first base site A via a communication network 20 shown in FIG. 11. In FIG. 1, the display device $14_{A1}$ placed in the first base site A displays the videos on the display face ($2_A$) of the corresponding video display unit $15_{A1}$, while the other display device $14_{A2}$ placed in the first base site A displays the videos on the display face ($3_A$) of the corresponding video display unit $15_{A2}$. That is, the videos of the state inside the second base site B captured by the imaging device $10_B$ of the second base site B are displayed on the video display unit $15_A$ of the first base site A. In the example shown in FIG. 4, the two imaging devices $10_{B1}$ and $10_{B2}$ are placed as the imaging device 10B. However, there may also be a single imaging device placed to capture the state inside the second base site B and to transmit it to the first base site A.

In FIG. 1, two imaging devices $10_{A1}$ and $10_{A2}$ as the imaging device 10A are placed as in the case of FIG. 4. Those imaging devices $10_{A1}$ and $10_{A2}$ capture the state inside the first base site A and transmit the videos thereof to the display device $14_B$ of the second base site B via the communication network 20 shown in FIG. 11. In FIG. 4, the display device $14_{B1}$ placed in the second base site B displays the videos on the display face ($2_B$) of the corresponding video display unit $15_{B1}$, while the other display device $14_{B2}$ placed in the second base site B displays the videos on the display face ($3_B$) of the corresponding video display unit $15_{B2}$. That is, the videos of the state inside the first base site A captured by the imaging device $10_A$ of the first base site A are displayed on the video display unit $15_B$ of the second base site B. In the example shown in FIG. 1, the two imaging devices $10_{A1}$ and $10_{A2}$ are placed as the imaging device 14. However, there may also be a single imaging device placed to capture the state inside the first base site A and to transmit it to the second base site B.

In FIG. 4, the imaging device $10_B$ inside the second base site B captures the state of the second base site B including the move of the person N in addition to the flow line T set on the floor face $F_A$ of the second base site B. Similarly, in FIG. 1, the imaging device $10_A$ inside the first base site A captures the state of the first base site A including the move of the person N in addition to the flow line $T_A$ set on the floor face $F_A$ of the first base site A.

FIG. 3 shows a case where the videos of the state captured inside the second base site B are displayed on the display faces ($2_A$, $3_A$) of the video display unit $15_A$ inside the first base site A. As shown in FIG. 3, the video display unit $15_A$ placed inside the first base site A displays the videos on the display faces ($2_A$, $3_A$) thereof by having the flow line $T_B$ of the second base site B linked with the flow line $T_A$ of the first base site A.

Further, in FIG. 1 and FIG. 4, an audio system (a sound collector $12_A$, a voice device $16_A$) for collecting the sound in the first base site A and outputting the sound of the second base site B is provided inside the first base site A, and an audio system (a sound collector $12_B$, a voice device $16_B$) for collecting the sound in the second base site B and outputting the sound of the first base site A is provided inside the second base site B.

In FIG. 1, shown is the example where the video display units $15_{A1}$ and $15_{A2}$ are disposed along the flow line $T_A$. As shown in FIG. 4, however, there may be a case where the video display units $15_{B1}$ and $15_{B2}$ exist over the region along the flow line $T_B$ and the inner back side of the flow line $T_B$. Life-size videos may be displayed on the display face in the center region out of the video display units $15_{A1}$ and $15_{A2}$ shown in FIG. 1 and FIG. 4

As described above, the communication system according to the first embodiment of the present invention is the system for inducing communication between the different base sites A and B as shown in FIG. 1 and FIG. 4, which includes the video display unit $15_A$ placed by corresponding to the flow line $T_A$ set on the floor face $F_A$ of the first base site A out of the different base sites and the imaging device $10_B$ for capturing the state inside the second base site B out of the different base sites. The flow line $T_A$ is a route along which persons go back and forth on the floor face $F_A$ of the base site A. The video display unit $15_A$ is built as a structure which transmits the state inside the second base site B as video information toward the corresponding flow line $T_A$ side of the first base site A by displaying the videos captured by the imaging device $10_B$.

Further, the communication system according to the first embodiment of the present invention is the system for inducing communication between the different base sites A and B as shown in FIG. 1 and FIG. 4, which includes the video display unit $15_A$ placed in the first base site A out of the different base sites A and B and the imaging device $10_B$ for capturing the state inside the second base site B including the move of the persons N in addition to the flow line $T_B$ set on the floor face $F_B$ of the second base site B out of the different base sites A and B. The flow line $T_B$ is a route along which the persons N go back and forth on the floor face $F_A$ of the base site B. The video display unit $15_A$ may be built as a structure which transmits the state inside the second base site B as video information toward the flow line $T_A$ of the first base site A by displaying the videos captured by the imaging device $10_B$.

When the communication system according to the first embodiment of the present invention is operated, the imaging device $10_B$ set inside the second base site B captures the videos inside the second base site B where the flow line $T_B$ of the route along which the persons N go back and forth. When capturing the videos by the imaging device $10_B$, the state inside the base site B is captured by including the move of the persons N in addition to the flow line $T_B$ set on the floor face $F_B$ of the second base site B. Through displaying the videos captured by the imaging device $10_B$ by the video display unit $15_A$, the state inside the second base site B is transmitted as the video information within the first space A.

When transmitting the video information by the video display unit $15_A$, the video display unit $15_A$ is disposed by corresponding to the flow line $T_A$ set inside the first base site A, and the video information is transmitted inside the first base site A toward the corresponding flow line $T_A$ side. Similarly, when transmitting the video information by the video display unit $15_B$, the video display unit $15_B$ is disposed by corresponding to the flow line $T_B$ set inside the second base site B, and the video information is transmitted inside the second base site B toward the corresponding flow line $T_B$ side. In such case, the first base site A and the second base site B may be any types of spaces such as offices where the persons N mainly conduct business transactions, work sites such as factories, commercial facilities, or the like as long as the spaces require communication.

Figure 11:
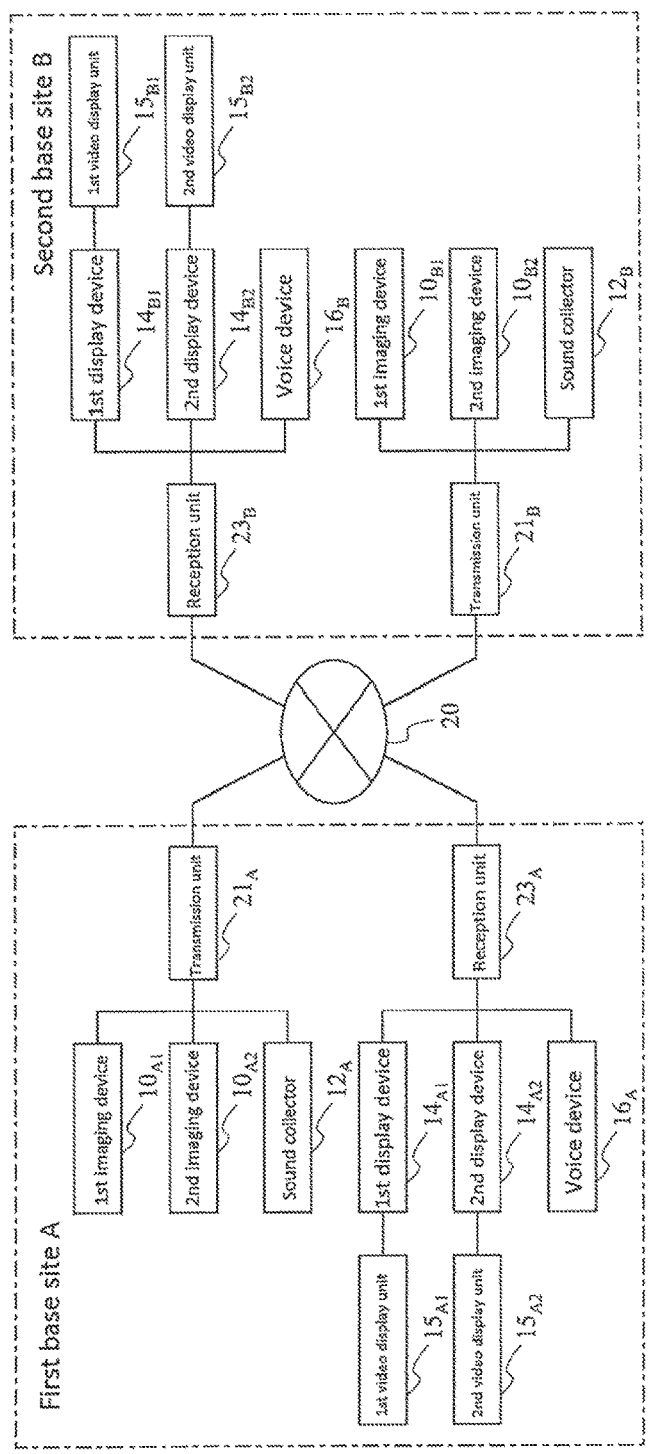
FIG. 11 is a block diagram of the communication system according to the embodiment of the present invention.

The persons N inside the different base sites A and B communicate with each other as necessary. Therefore, as shown in FIG. 4, the video display unit $15_A$ and the imaging device $10_A$ for capturing videos may be placed inside the first base site A and also the video display unit $15_B$ for displaying video information and the imaging device $10_B$ may be placed inside the second base site B to mutually transmit the states inside the different base sites A and B. For the mutual communication, the existing communication network (e.g., the Internet network) 20 provided between the different base sites A and B as shown in FIG. 11 may be used.

For feeling a sense of sharing the different base sites A and B as the same space, the state inside the second base site B may be captured successively by the imaging device $10_B$ of the second base site B and the state inside the second base site B captured by the imaging device $10_B$ may be transmitted successively as the video information in the first base site A by the video display unit $15_A$ of the first base site A and also the state inside the first base site A may be captured successively by the imaging device $10_A$ of the first base site A and the state inside the first base site A captured by the imaging device $10_A$ may be transmitted successively as the video information in the second base site B by the video display unit $15_B$ of the second base site B.

Described herein is a case where communication is induced assuming that the different base sites A and B are offices. In the offices, a plurality of desks are placed and printers, for example, shared by a plurality of persons N are placed in one place in a concentrated manner to improve efficiency of business work. In the offices, the flow lines with which the efficient move of the persons can be achieved are set as the routes (flow lines $T_A$, $T_B$) from the desks of each person to the printers. In that case, a new idea may be realized as an effective one through allowing the persons in charge in the distant offices to communicate with each other instantly. The instant communication leads to improving the business work efficiency.

Thus, when the communication system according to the embodiment of the present invention is placed in each of the different base sites A and B as shown in FIG. 4 and those are operated simultaneously, each of the imaging device $10_B$ in the second base site B and the imaging device $10_A$ in the first base site A is operated to capture the videos in the base sites B and A where the flow lines $T_B$, $T_A$ of the routes along which the persons go back and forth are set. When capturing the videos by the imaging devices $10_B$, $10_A$, the imaging device $10_B$ in the second base site B captures the state inside the second base site B including the move of the persons N in addition to the flow line $T_B$ set in the second base site B. Similarly, the imaging device $10_A$ in the first base site A captures the state inside the first base site A including the move of the persons N in addition to the flow line $T_A$ set in the first base site A.

When each of the imaging devices $10_A$, $10_B$ placed in the first base site A and the second base site B is operated to capture the states inside the target base sites A and B, the base sites A and B can have bidirectional communication via the existing communication network (see FIG. 11) line provided therebetween so that, as shown in FIG. 2 and FIG. 3, the videos of the state inside the second base site B captured by the imaging device $10_B$ of the second base site B are displayed by the video display unit $15_A$ in the first base site A and transmitted as the video information in the first base site A. Similarly, the videos of the state inside the first base site A captured by the imaging device $10_A$ of the first base site A are displayed by the video display unit $15_B$ in the second base site B and transmitted as the video information in the second base site B.

When transmitting the video information by the video display unit $15_A$ and the video display unit $15_B$, the video display unit $15_A$ is placed by corresponding to the flow line $T_A$ set within the first base site A to transmit the video information toward the corresponding flow line $T_A$ side in the first base site A. Similarly, when transmitting the video information by the video display unit $15_B$, the video display unit $15_B$ is placed by corresponding to the flow line $T_B$ set within the second base site B to transmit the video information toward the corresponding flow line $T_B$ side in the second base site B.

Therefore, as shown in FIG. 2 and FIG. 3, the state of different base site spreads in front of the eyes as the video information, thereby producing a sense of feeling as if the person at distant was right next beyond the actual distance. This makes it possible to stimulate communication with the distant office so that intellectual creativity such as innovation can be promoted by inducing new ideas.

The surface-like members constituting the video display units $15_A$, $15_B$ are disposed by corresponding to the flow lines $T_A$, $T_B$ set within the first base site A and the second base site B for transmitting the video information toward the corresponding flow lines $T_A$, $T_B$ within the corresponding base site A or base site B. Therefore, as shown in FIG. 3, it is possible to have a conversation on the flow lines $T_A$, $T_B$ as desired and it is also possible to have a conversation with the persons in the different space by going to the flow lines. Furthermore, it is possible to feel the state (atmosphere) of the different space on the flow lines $T_A$, $T_B$ and to feel the existence without talking.

Further, through successively capturing the states in the different spaces A, B by the imaging devices $10_A$, $10_B$ and successively transmitting, by the video display units $15_A$, $15_B$, the states of the different base sites B, A as the video information based on the videos showing the states of the base site B or A outputted from the imaging devices $10_B$, $10_A$, business work can be smoothened and sped up by having daily interaction. In such case, as shown in FIG. 2, through placing sets of the desks and chairs by using a part of the spaces in the base sites A and B, the spaces can be turned into conference rooms instantly, and unused spaces can be utilized effectively.

Furthermore, through placing the video display units $15_A$, $15_B$ and the imaging devices $10_A$, $10_B$ in the different spaces A and B, respectively, the video information showing the states of the base sites B and A as the counterpart within the different base sites A and B is transmitted. This makes it possible to acquire a sense of being together in a same space, so that the different base sites can be shared as a single space and a latent potentiality can be brought out based on combined effects of the persons by linking the spaces.

In FIG. 1, described is the example of using the panels 2, 3 disposed in the center area of the space such as the office for the surface-like members as the display media. However, inner walls of a building forming a corner of an office or the like may be used as the surface-like members as the display media. The video display unit $15_A$ is configured on the inner wall surfaces forming the corner of the building. Such cases will be described by referring to FIG. 17 and FIG. 18. As shown in FIG. 17, the communication system according to the first embodiment of the present invention is the system for inducting communication between the first base site A and the second base site B, which includes the video display unit $15_A$ existing in the first base site A and the imaging device for capturing the state in the second base site B. The video display unit $15_A$ is configured with a plurality of surface-members for displaying the video of the state in the second base site B captured by the imaging device $10_B$. By forming a corner $S_A$ through combining the plurality of surface-like members, the state in the second base site B is projected at the corner $S_A$ that has not been used actively. Thereby, the space within the second base site B is expanded via the corner $S_A$ so that a sense of feeling as if the person at distant was right next beyond the actual distance can be generated and the corner $S_A$ can be utilized effectively as a place of communication. Then, in the corner $S_A$ turned into the place of communication, communication between the different base sites is induced and communication with the distant office can be stimulated. This makes it possible to induce new ideas and to promote intellectual creativity such as innovation.

The inner walls (surface-like members of the display media) of the building as the plurality of surface-like members form the corner $S_A$ with each of the video display units $15_A$ facing toward the inner side of the corner $S_A$. Through displaying the videos of the state within the second base site B captured by the imaging device $10_B$ on the video display units $15_A$, the state of the different base site spread in front of the eyes at the corner $S_A$ as shown in FIGS. 2 and 3 so that the corner $S_A$ serves as the communication start point. This makes it possible to achieve effective utilization of the corner $S_A$. At the same time, the person on the inner side of the corner $S_A$ can sense a feeling of existence as if the person at distant was right next beyond the actual distance with a more sense of realism and immersion.

Figure 18:
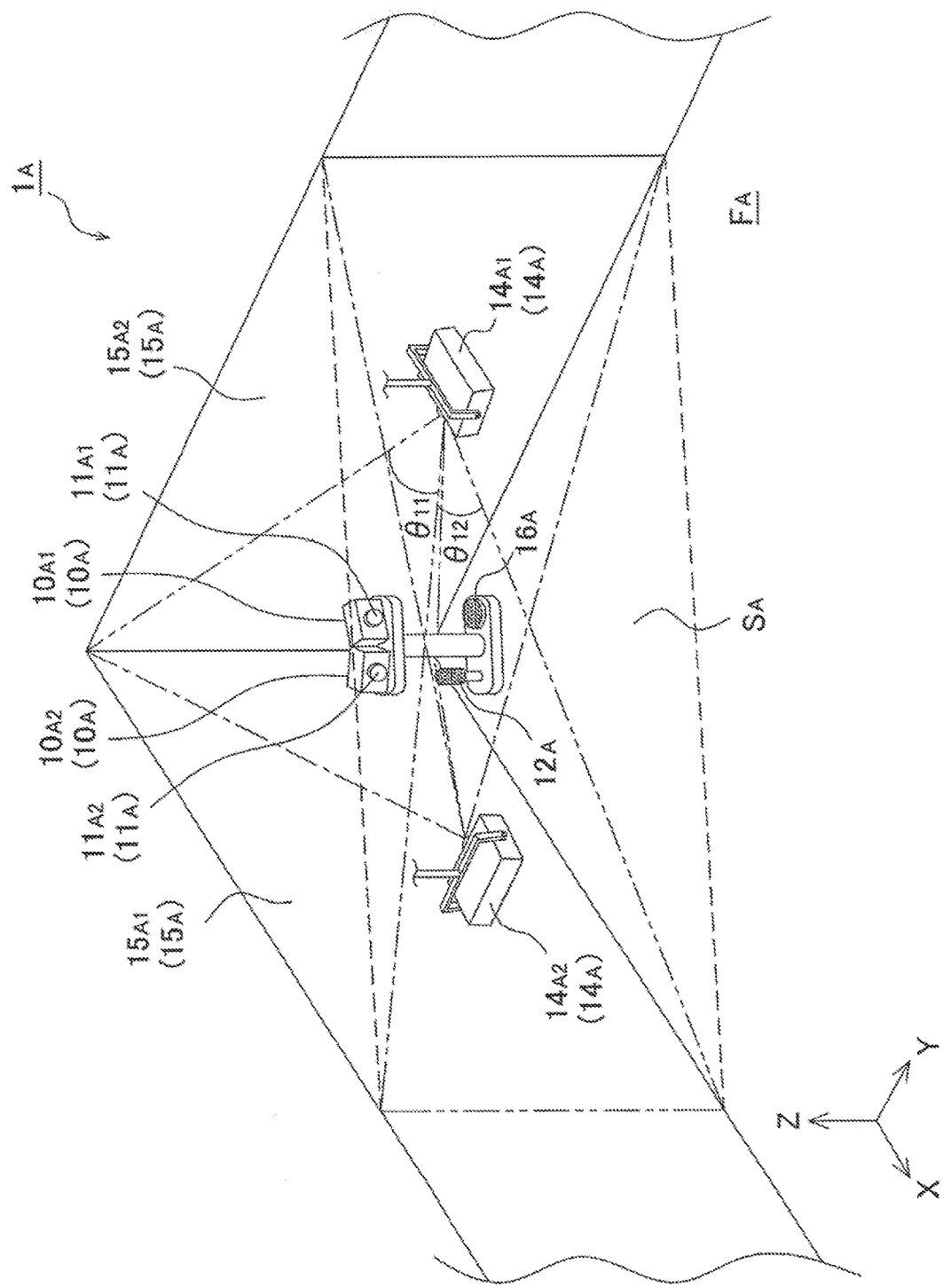
FIG. 18 is a perspective view showing an external appearance of the communication system according to the embodiment of the present invention.

Note here that the corner $S_A$ is a spatial area formed by combining the inner walls of the building as the surface-like members with which the person N inside the spatial area can view the video of the state within the second base site B via the video display unit $15_A$ formed on the inner wall surfaces as the surface-like members and receive the video information. Specifically, the corner $S_A$ in the embodiment is the spatial area formed by combining two intersecting inner walls of a building forming a corner as shown in FIG. 18, which is the spatial area surrounded by the video display unit $15_{A1}$, the video display unit $15_{A2}$, and a plane (X-Z plane) formed by connecting the left end of the video display unit $15_{A1}$ from the display device $14_{A1}$ side and the right end of the video display unit $15_{A2}$ from the display device $14_{A2}$ side.

In FIG. 1, shown is the case where the existing panels 2, 3 are built as the video display units $15_A$ (video display units $15_{A1}$, $15_{A2}$) and the video display units $15_B$ (video display units $15_{B1}$, $15_{B2}$). However, there may be no such existing panels 2, 3 and the like depending on the offices, for example, so that the communication system according to the embodiment of the present invention may be placed at the base sites A and B by utilizing frames or the like in such case. Examples of the frame in such case will be described by referring to FIG. 4 to FIG. 13.

Shown in FIG. 4 is a communication system 1 capable of achieving lifelike and real-time communication between different spaces (mainly distant offices, factories, or the like) of the first base site A and the second base site B through: placing a communication system $1_A$ in the first base site A; placing a communication system $1_B$ in the second base site B; and transmitting videos and sounds showing the state of the time and space of the second base site, which are captured by the communication system $1_B$ of the second base site B, in the first base site A by using the communication system $1_A$ of the first base site A. Similarly, through transmitting videos and sounds captured by the communication system $1_A$ of the first base site A in the second base site B by using the communication system $1_B$ of the second base site B, it is possible to produce such an effect that as if the first base site A and the second base site B were in a same space regardless of the fact that the first base site A and the second base site B are in different spaces. Therefore, the communication system 1 can achieve the lifelike and real-time communication in both directions.

The communication system 1 according to the embodiment of the present invention is placed by utilizing flow lines as the routes along which persons go back and forth, which are set on the floors of the first base site A and the second base site B as shown in FIG. 4. That is, the first base site A and the second base site B originally exist at different sites, so that the flow lines of the first base site A and the flow lines of the second base site B exist separately and individually. Thus, face-to-face communication between the persons working on the respective flow lines can only be achieved limitedly within the first base site A or the second base site B. For example, as described above, it is the actual circumstance that face-to-face communication between the first base site A and the second base site B located at distant places is done via web conferences or teleconferences. However, with the communication using those systems, a sense of distance between the first base site A and the second base site B cannot be swept away so that it lacks a sense of realism. Also, there is a limit in those systems in respect that communication cannot be done between both base sites unless the web conference systems or the teleconference systems are operated simultaneously at both base sites.

Provided therefore is the communication system 1 which can produce such an effect for the first base site A and the second base site B that as if the first base site A and the second base site B were in a same space so that it is possible to achieve the lifelike and real-time communication in both directions.

The communication system 1 includes the communication system $1_A$ and the communication system $1_B$. Details of the structures thereof will be described by referring to FIG. 4 to FIG. 13. Since the communication system $1_A$ and the communication system $1_B$ of the communication system 1 have similar structures, explanations will be provided centering on the communication system $1_A$ hereinafter.

Figure 7B:
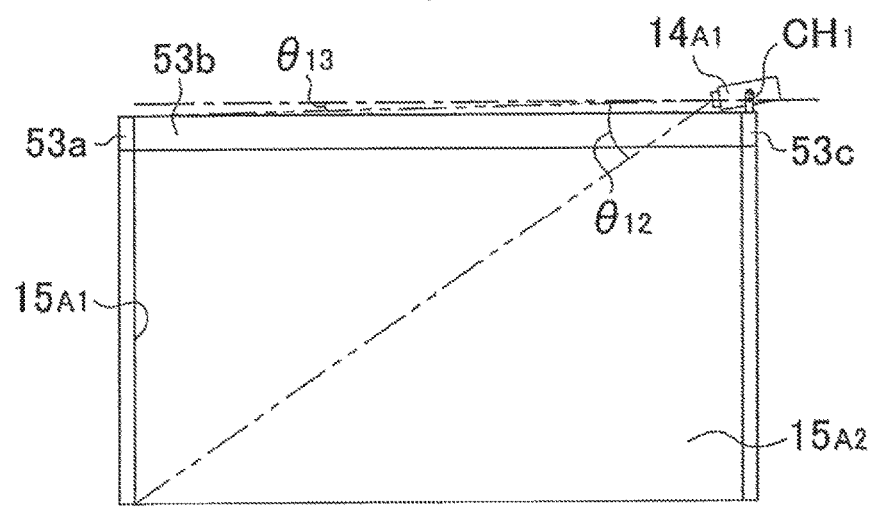
Figure 9A:
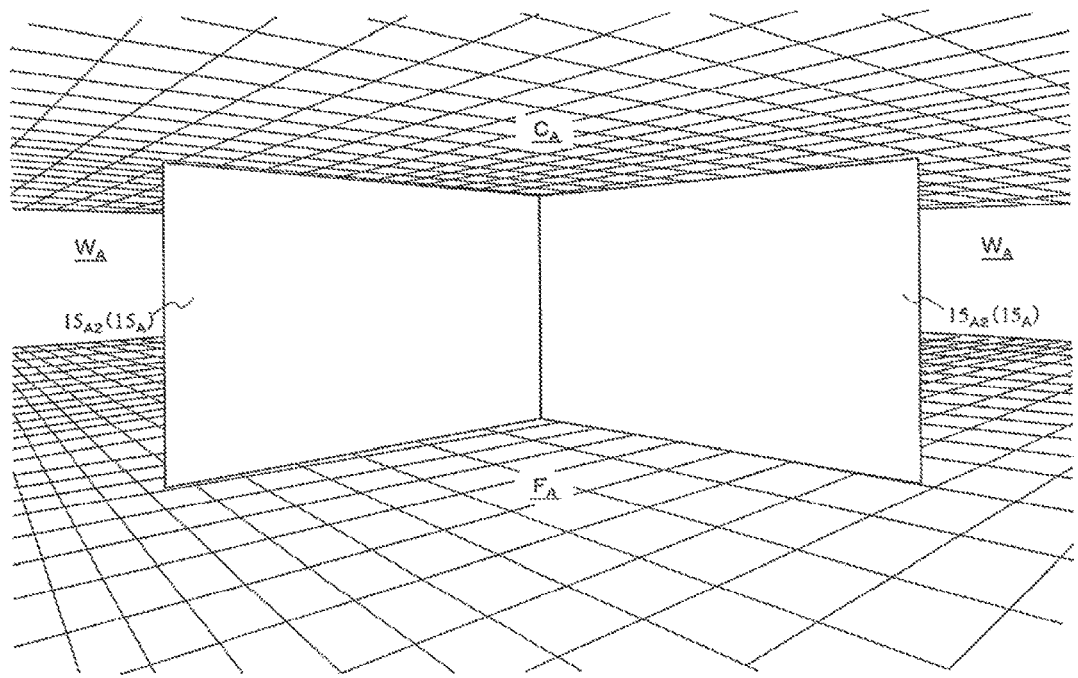
Figure 9B:
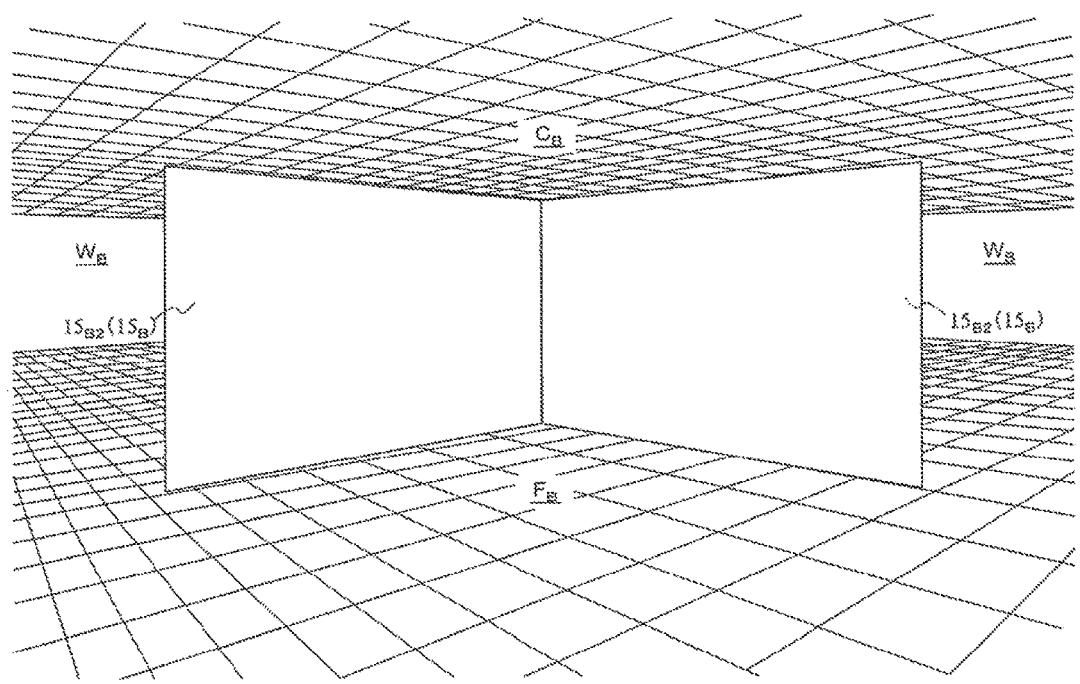
Figure 10A:
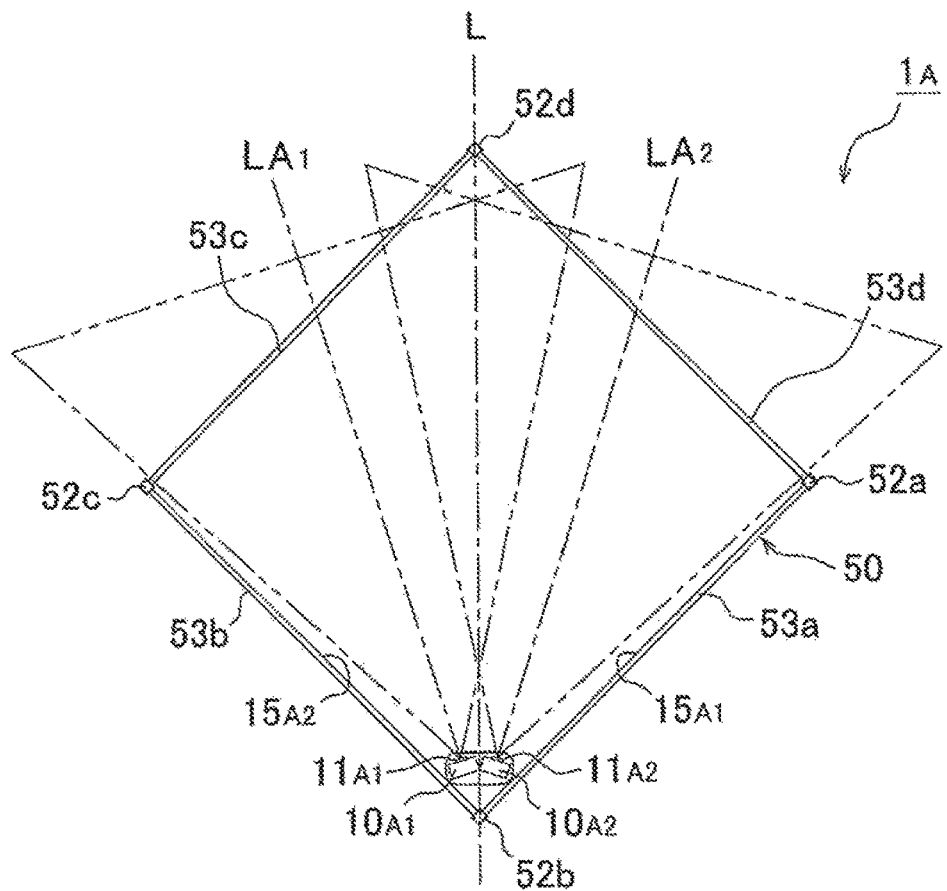
Figure 10B:
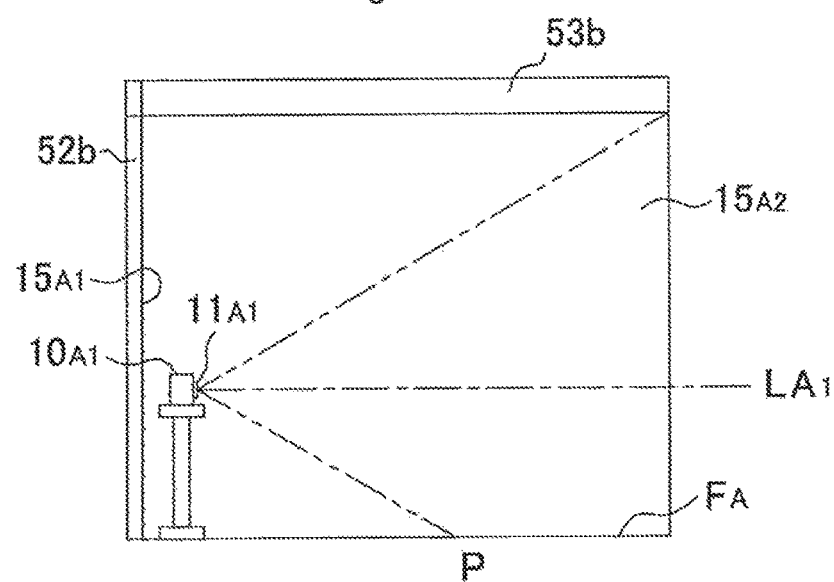

FIG. 4 is an illustration showing a configuration of a case where the communication systems $1_A$ and $1_B$ are placed at the first base site A and the second base site B, respectively. FIG. 5 is a perspective view showing the external appearance of the communication system $1_A$ shown in FIG. 4. FIG. 6 is an exploded perspective view of the communication system $1_A$ shown in FIG. 4. FIGS. 7A and 7B show a layout of the display device $14_A$ and the video display unit $15_A$ of the communication system $1_A$ shown in FIG. 4, in which FIG. 7A is schematic plan view of the layout and FIG. 7B is a schematic side view of the layout. FIGS. 8A through 8D show schematic views showing close or abutting relations of the video display unit $15_A$ of the communication system $1_A$ shown in FIG. 1 with respect to the floor face $F_A$ and the ceiling $C_A$ of the first base site A. FIGS. 9A and 9B show a layout of the video display unit $15_A$ of the communication system $1_A$ shown in FIG. 1, in which FIG. 9A is schematic view of the layout in the first base site A and FIG. 9B is a schematic view of the layout in the second base site B. FIGS. 10A and 10B show a layout of the imaging device $10_A$ of the communication system $1_A$ shown in FIG. 4, in which FIG. 10A is a schematic plan view of the layout and FIG. 10B is a schematic side view of the layout. FIG. 11 is a block diagram of the communication systems $1_A$ and $1_B$ shown in FIG. 4. In FIGS. 9A and 9B, other structural elements than the video display units $15_A$ and $15_B$ are omitted.

(Structure of Communication System)

In the communication system 1 shown in FIG. 4, the communication system $1_A$ provided in the first base site A includes, as shown in FIG. 4, FIG. 5, and FIG. 11: the imaging devices $10_A$ ($14_1$, $10_{A2}$); the sound collector $12_A$; the video unit; the voice device $16_A$; a transmission unit $21_A$; a reception unit $23_A$; and a frame 50. Hereinafter, each of the structures will be described. Note that the communication system $1_B$ provided in the second base site B has similar structures, so that explanations thereof are omitted.

(Frame)

The communication system $1_A$ shown in FIG. 4 includes the frame 50 as shown in FIG. 4 and FIG. 5. The frame 50 is configured with a plurality of supports 52 (a first support 52a to a fourth support 52d; four supports in this embodiment) provided on the flat floor face $F_A$ of the place to be disposed and beam members 53 (a first beam member 53a to a fourth beam member 53d; four beam members in this embodiment) for connecting the upper parts of the supports 52 to each other. It is preferable for the frame 50 to be provided by loading the supports 52 on the floor face $F_A$ so that no main frame construction work is required for the floor face $F_A$. However, the frame may also be provided by being fixed to the floor face $F_A$.

As shown in FIG. 4 and FIG. 5, the frame 50 is a framework structure formed by a combination of the supports and the beams. The supports 52 configuring the frame 50 include the first support 52a to the fourth support 52d, and the beam members 53 include the first beam member 53a to the fourth beam member 53d. The length of the supports 52 (the first support 52a to the fourth support 52d) and the length of the beam members 53 (the first beam member 53a to the fourth beam member 53d) may be selected to be the same or different as appropriate. The supports 52 and the beam members 53 of the frame 50 shown in FIG. 4 and FIG. 5 are formed in the same length to form a solid shape as a whole.

The communication system $1_A$ shown in FIG. 4 is assembled by connecting the first support 52a to the fourth support 52d with the first beam member 53a to the fourth beam member 53d on the flat floor face $F_A$ as the place to be disposed as shown in FIG. 6.

First, the first beam member 53a is connected between the upper part of the first support 52a and the upper part of the second support 52b, the second beam member 53b is connected between the upper part of the second support 52b and the upper part of the third support 52c, the third beam member 53c is connected between the upper part of the third support 52c and the upper part of the fourth support 52d, and the fourth beam member 53d is connected between the upper part of the fourth support 52d and the upper part of the first support 52a in order to form the frame 50 in a frame shape. Further, other frame members (not shown) may be connected between the lower part of the first support 52a and the lower part of the second support 52b and between the lower part of the second support 52b and the lower part of the third support 52c, for example. The beam members 53 (53a to 53d) may be connected directly to the supports 52 (52a to 52d) or may be connected with connecting members 55 (55a to 55d) as fitting members interposed therebetween.

Note that the numbers and the sizes of the supports and the beam members configuring the frame 50 shown in FIG. 4 are not specifically limited. For example, it is preferable for the height of the first support 52a to the fourth support 52d to be lower than the height from the floor to the ceiling of the place to be disposed when the communication system $1_A$ is to be disposed inside a building. It is because the communication system $1_A$ can be disposed, removed, and transferred easily. Also, the lengths of the first beam member 53a to the fourth beam member 53d may be set as appropriate depending on the usage of the communication system $1_A$.

As shown in FIG. 5, the embodiment shows a case of the frame 50 in which the first beam member 53a to the fourth beam member 53d form a substantially square-shape structure on a plan view. However, as will be described later, the structure may simply be able to have the video display unit $15_A$ and the display device $14_A$ fitted and fixed, so that the present invention is not limited only to the embodiment. Further, each of the beam members is not limited only to a straight-line shape but may also be a curved structure. The shapes thereof are not specifically limited.

(Video Unit)

Figure 12A:
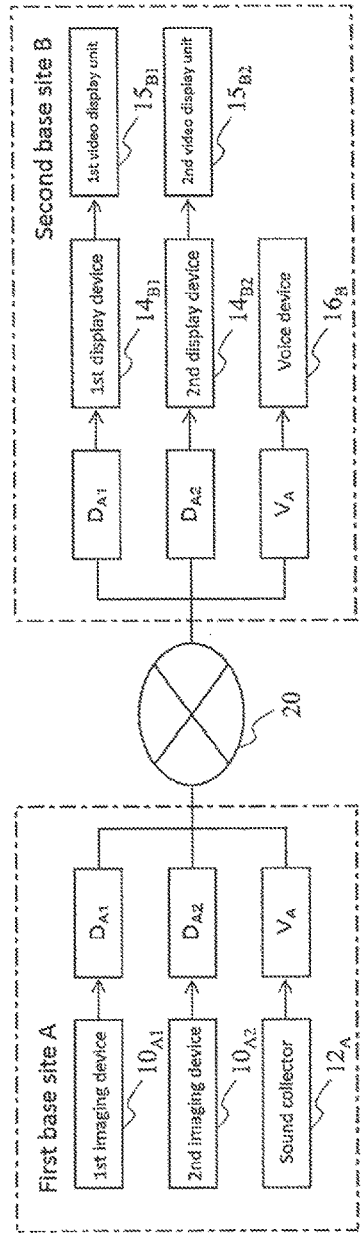
Figure 12B:
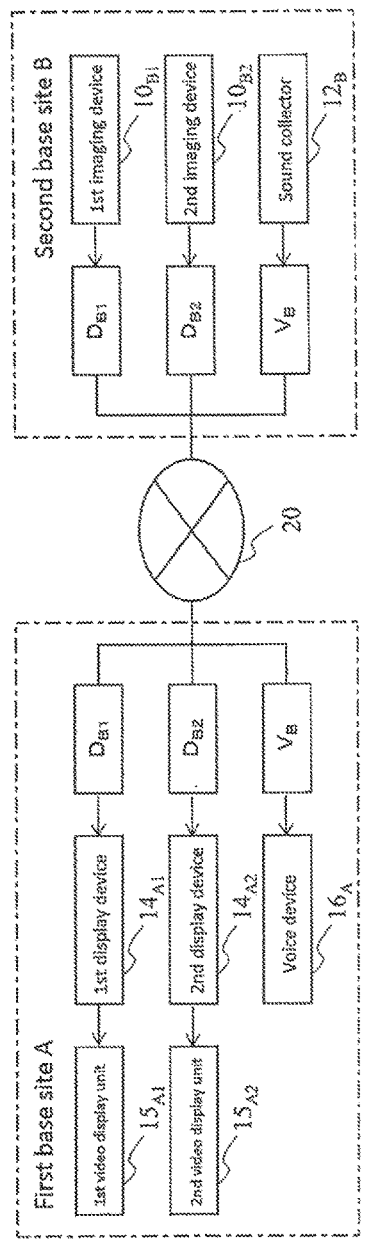

As shown in FIG. 4 and FIGS. 12A and 12B, the video unit of the communication system $1_A$ shown in FIG. 4 is a means for displaying, in the first base site A, videos captured in the second base site B. In the embodiment, described is an example where the video unit of the communication system $1_A$ is configured with the display device $14_A$ which projects videos ($D_{B1}$ and/or $D_{B2}$) captured in the second base site B and the video display unit $15_A$ having a display face where the videos ($D_{B1}$ and/or $D_{B2}$) captured in the second base site B are projected. While the display device $14_A$ is configured with a projector and the video display unit $15_A$ is configured with a screen, as a way of example, the display device and unit are not limited only to those. In a case where a digital display such as a liquid crystal display is used as the video display unit, the video display unit $15_A$ corresponds to a display panel such as a liquid crystal panel and the display device $14_A$ corresponds to a drive circuit for driving the display panel. In a case where a digital display is used as the video unit, it is not necessary to use a projector that increases the weight. Thus, the weight of the video unit can be lightened. In this case, it is also unnecessary to use a projector, so that the fourth support 52d, the third beam member 53c, and the fourth beam member 53d can be omitted.

In the embodiment, as shown in FIG. 5, as the two display devices $14_{A1}$ and $14_{A2}$, the first display device $14_{A1}$ is placed on the third beam member 53c of the frame 50 and the second display device $14_{A2}$ is placed on the fourth beam member 53d. Also, as the two video display units $15_{A1}$ and $15_{A2}$, the first video display unit $15_{A1}$ is placed on a plane (X-Z plane) surrounded by the first support 52a, the second support 52b, and the first beam member 53a of the frame 50 and the second video display unit $15_{A2}$ is placed on a plane (Y-Z plane) surrounded by the second support 52b, the third support 52c, and the second beam member 53b. In the embodiment, while there are two each of the display devices $14_A$ and the video display units $15_A$, the numbers of those to be disposed are not limited to such case as long as at least one each of those are provided. It is because the display device $14_A$ and the video display unit $15_A$ of the communication system 1 shown in FIG. 4 may simply be in the structures with which the videos ($D_{B1}$ and/or $D_{B2}$) captured in the second base site B can be viewed in the first base site A, and there is no limit set in the numbers of the display device $14_A$ and the video display unit $15_A$ as long as those can provide effects of the communication system 1.

Further, in the embodiment, as shown in FIG. 5 and FIGS. 7A and 7B, the video projected by the first display device $14_{A1}$ that is disposed on an opposing side of the first video display unit $15_{A1}$ is projected and displayed on the entire surface or an almost entire surface of the first video display unit $15_{A1}$. Also, the video projected by the second display device $14_{A2}$ that is disposed on an opposing side of the second video display unit $15_{A2}$ is projected and displayed on the entire surface or an almost entire surface of the second video display unit $15_{A2}$. However, videos of the first display device $14_{A1}$ and the second display device $14_{A2}$ may simply need be projected on the entire surface or almost the entire surface of the first video display unit $15_{A1}$ or the second display unit $15_{A2}$. Thus, in a layout relation shown in FIG. 7A, for example, the video of the first display device $14_{A1}$ may be projected and displayed on the second video display unit $15_{A2}$, and the video of the second display device $14_{A2}$ may be projected and displayed on the second video display unit $15_{A2}$ as well.

Further, in the embodiment, the first display device $14A_1$ is provided at the third beam member 53c and the second display device $14_{A2}$ is provided at the fourth beam member 53d to project the videos from high positions. Thus, the videos to be projected are not blocked even when persons move in the inside space $S_A$ of the frame 50, and the space of the communication system $1_A$ of the first base site A and the space of the communication system $1_B$ of the second base site B together form a single communicable space.

The display device $14_A$ and the video display unit $15_A$ may simply be the video unit with which the videos ($D_{B1}$ and/or $D_{B2}$) captured in the second base site can be viewed in the first base site. Thus, those are not limited to a combination of a projector and a screen. For example, the video unit may be configured with a liquid crystal display, and there is no specific limit set thereon.

Further, as shown in FIG. 4, when a person standing in an inside space $S_B$ of the frame 50 of the communication system $1_B$ of the second base site B is captured by the imaging device $10_B$ and the videos ($D_{B1}$, $D_{B2}$) are projected on the video display unit $15_A$ of the communication system $1_A$ of the first base site A, it is preferable for the video display unit $15_A$ to be formed in the size capable of projecting the life-size videos of the person standing in the inside space $S_B$. It is because the communication system 1 according to the embodiment can provide such an effect for the different spaces of the first base site A and the second base site B that as if the person in the first base site A and the person in the second base site B were in a same space so that it is possible to achieve lifelike and real-time conversations in both directions. Therefore, it is possible to produce such an effect that as if the different spaces of the first base site A and the second base site B were in the same space.

As shown in FIG. 5, the first video display unit $15_{A1}$ is provided to cover one side face (X-Z plane) of the frame 50 surrounded by the first support 52a, the second support 52b, and the first beam member 53a, while the second video display unit $15_{A2}$ is provided to cover one side face (Y-Z plane) of the frame 50 surrounded by the second support 52b, the third support 52c, and the second beam member 53b. Thus, the two side faces of the frame 50 are blocked. Therefore, the side face surrounded by the third support 52c, the fourth support 52d, and the third beam member 53c, the side face surrounded by the fourth support 52d, the first support 52a, and the fourth beam member 53d, and the top face surrounded by the first beam member 53a to the fourth beam member 54d are left open, thereby forming the inside space $S_A$.

As shown in FIG. 5 and FIG. 7A, the first video display unit $15_{A1}$ and the second video display unit $15_{A2}$ as a whole form the video display unit ($15_A$) being bent at an angle α (see FIG. 7A) on a plan view. While the angle α shown in FIG. 7A is 90 degrees, a 180-degree flat surface may be employed as well. The point is that the angle α can be set as appropriate as long as the communication system 1 according to the embodiment can be effectuated.

The video display unit $15_A$ may simply be a display face on which the videos ($D_{B1}$ and/or $D_{B2}$) captured in the second base site B can be projected. Thus, the video display unit $15_A$ is not limited to be formed with the surface-like member itself as the display media as shown in FIG. 6 and the like but may also be formed as a surface-like medium (display medium) such as a cloth screen disposed in front of the panel or the inner wall of a building. Further, the video display unit $15_A$ may be formed on the entire surface or a part of the surface-like member (see FIG. 8D).

Further, as shown in FIG. 5, it is preferable for the lower end of the video display unit $15_A$ to be close to or to abut against the floor face $F_A$ of the first base site A and preferable for the upper end of the video display unit $15_A$ to be close to or to abut against the ceiling $C_A$ of the first base site A. That is, it is preferable for the lower end of the video display unit $15_A$ to abut against the floor face $F_A$ of the first base site A (see FIGS. 8A, 8C, 8D) or to be close to the floor face $F_A$ of the first base site A (see FIG. 8B). With such structures, the videos of the second base site B can be displayed on the video display unit $15_A$ to a sufficiently lower position than the eye levels of the viewers who see the videos on the video display unit $15_A$.

Figure 8A:
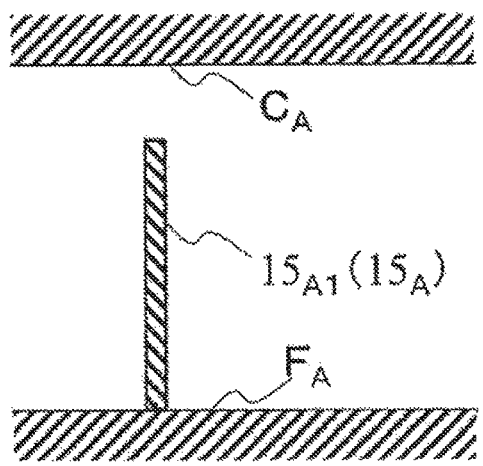
FIGS. 8A through 8D show schematic views showing close or abutting relations of the video display unit of the communication system according to the embodiment of the present invention with respect to a floor face and a ceiling of the first base site.
Figure 8B:
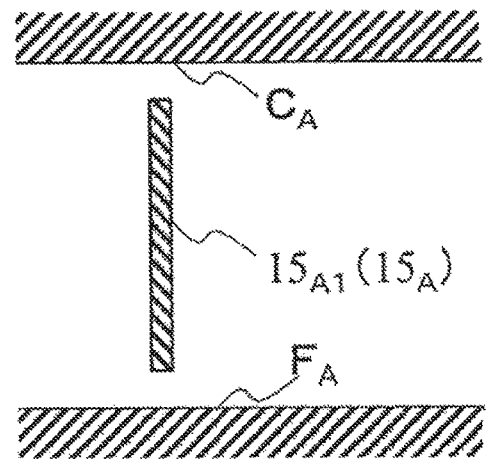
Figure 8C:
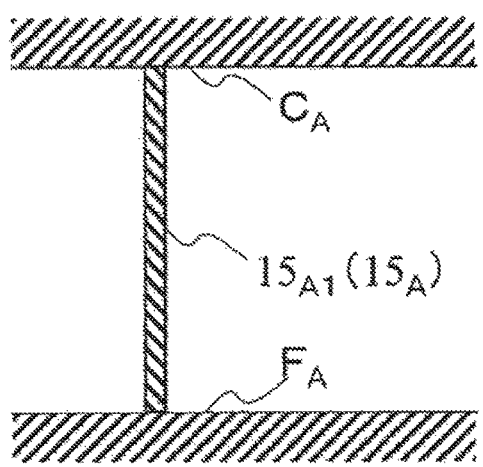
Figure 8D:
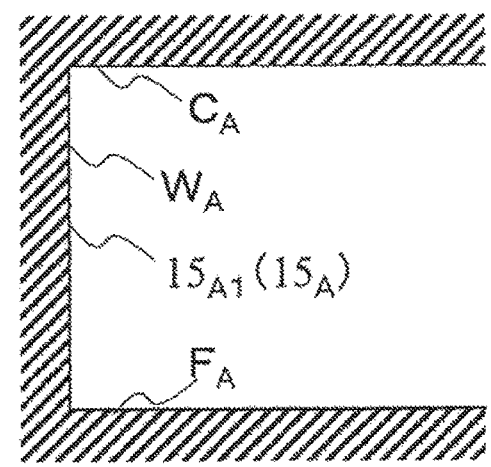

Also, it is preferable for the upper end of the video display unit $15_A$ to be close to the ceiling $C_A$ of the first base site A (see FIGS. 8A and 8B) or to abut against the ceiling $C_A$ of the first base site A (see FIGS. 8C and 8D). Alternatively, as shown in FIGS. 9A and 9B, between the upper end of the video display unit $15_A$ and the ceiling $C_A$ of the first base site A, a wall face $W_A$ of the first base site A is preferable to be set at a height not entering into the view of the viewer standing toward the video display unit $15_A$. With such structures, the videos of the second base site B can be displayed on the video display unit $15_A$ to a sufficiently higher position than the eye levels of the viewers who see the videos on the video display unit $15_A$.

The surface-like member for forming the first video display unit $15_{A1}$ is not specifically limited. For example, in a case of using a highly strong plate-like member (e.g., steel-made or wooden member), the first beam member 53a of the frame 50 can be omitted. That is, the first support 52a, the second support 52b, and the surface-like member may simply be connected. Similarly, when forming the second video display unit $15_{A2}$ by using a highly strong material, the second beam member 53b of the frame 50 can be omitted. That is, the second support 52b, the third support 52c, and the surface-like member may simply be connected. Further, through connecting the surface-like member configuring the first video display unit $15_{A1}$ formed with the highly strong material and the surface-like member configuring the second video display unit $15_{A2}$, one of or all of the first support 52a, the second support 52b, and the third support 52c can be omitted.

When configuring the first video display unit $15_{A1}$ (and/or the second video display unit $15_{A2}$) as a screen, it is preferable to form the surface-like member itself used for configuring the first video display unit $15_{A1}$ (and/or the second video display unit $15_{A2}$) with a member exhibiting no translucency or preferable to provide a member exhibiting no translucency on the back side of the surface-like member used for configuring the first video display unit $15_{A1}$ (and/or the second video display unit $15_{A2}$) in order to display clear videos without transmitting light from the back side of the first video display unit $15_{A2}$ (and/or the second video display unit $15_{A2}$).

(Voice Device)

As shown in FIG. 4 and FIG. 5, the voice device $16_A$ is configured with a speaker and the like, and it is a device that produces sounds ($V_B$) (illustrated in FIGS. 12A and 12B) collected in the second base site B. In order to produce lifelike sounds, two or more sound collectors $12_B$ to be described later may be provided, and two or more voice devices $16_A$ may be provided by corresponding thereto.

(Imaging Device)

The imaging device $10_A$ is configured with a video camera or the like, and it is a device including a camera lens $11_A$ for capturing videos of a prescribed space in the first base site A.

As shown in FIG. 5, the embodiment shows the case where two imaging devices $14_2$ and $14_2$ are used as the imaging device $10_A$. However, the number of the imaging device $10_A$ to be disposed is not limited to two as long as there is at least one.

As shown in FIG. 5, the first imaging device $10_{A1}$ and the second imaging device $10_{A2}$ are provided in the center part of the video display unit $15_A$ and disposed in the vicinity of the border between the first video display unit $15_{A1}$ and the second video display unit $15_{A2}$ (in the vicinity of the second support 52b) to capture videos in two directions individually from the disposed place (single point). The first imaging device $10_{A1}$ and the second imaging device $10_{A2}$ successively output the videos ($D_{A1}$, $D_{A2}$) captured along each of the imaging directions (see optical axis directions $LA_2$, $LA_2$ of FIG. 10A) individually.

As shown in FIG. 4 and FIG. 5, the communication system $1_A$ is configured with the frame 50. In the frame 50, the side face surrounded by the third support 52c, the fourth support 52d, and the third beam member 53c, the side face surrounded by the fourth support 52d, the first support 52a, and the fourth beam member 53d, and the top face surrounded by the first beam member 53a to the fourth beam member 53d are open, and the first imaging device $10_{A2}$ and the second imaging device $10_{A2}$ capture and output the videos ($D_{A1}$, $D_{A2}$) with a depth in the optical axis directions $LA_1$, $LA_2$ shown in FIG. 10A. Thus, not only the inside space $S_A$ formed in the frame 50 but also the outside space thereof can be captured. Therefore, as shown in FIGS. 10A and 10B, not only the persons moving in the inside space $S_A$ but also the space and persons moving over the inside space $S_A$ can be captured, so that it is possible to capture the videos in which different spaces are integrated.

(Sound Collector)

As shown in FIG. 4 and FIG. 5, the sound collector $12_A$ is configured with a microphone or the like, and it is a device for collecting sounds in a prescribed space of the first base site A. The sound collector successively outputs the collected sounds ($V_A$) (illustrated in FIGS. 12A and 12B). Further, there may be two sound collectors $12_A$ or more. The sound collector $12_A$ may be set to collect only the sounds in the inside space $S_A$ of the frame 50.

(Transmission Unit and Reception Unit)

As shown in FIG. 11 and FIGS. 12A and 12B, the communication system $1_A$ includes the transmission unit $21_A$ and the reception unit $23_A$ as a communication means for enabling communication via the communication network 20 such as the Internet. The transmission unit $21_A$ sends out the videos $D_{A1}$, $D_{A2}$ captured and outputted by the imaging devices $10_{A1}$, $10_{A2}$ as well as the sounds $V_A$ collected and outputted by the sound collector $12_A$ to the communication network 20. The reception unit $23_A$ receives the videos $D_{B2}$, $D_{B2}$ captured and outputted in the second base site B as well as collected and outputted sound $V_B$ from the communication network 20. Note that the communication network 20 is not limited to the Internet but may also be the communication network via the Intranet or other communication lines.

(Control Device)

At least one control device (not shown) may be provided by being connected to all of or a part of the first imaging device $10_{A1}$, the second imaging device $10_{A2}$, the sound collector $12_A$, the first display device $14_{A1}$, the second display device $14_{A2}$, the voice device $16_A$, the transmission unit $21_A$, the reception unit $23_A$ for controlling actions thereof. The control device may be configured with a personal computer, for example.

(Assembling of Communication System)

Assembling of the communication systems $1_A$ and $1_B$ will be described by referring to FIG. 6.

In the first base site A, a first connecting member 55a and a second connecting member 55b are connected to both ends of the first beam member 53a. One end of the second beam member 53b is connected to the second connecting member 55b, and a third connecting member 55c is connected to the other end of the second beam member 53b. One end of the third beam member 53c is connected to the third connecting member 55c, and a fourth connecting member 55d is connected to the other end of the third beam member 53c. The first beam member 53a and the fourth connecting member 53d are connected to both ends of the fourth beam member 53d. Thereby, the first beam member 53d to the fourth beam member 53d are connected in a frame form via the first connecting member 55a to the fourth connecting member 55d.

Then, while lifting up the first beam member 53a to the fourth beam member 53d connected in a frame form, the first support 52a to the fourth support 52d are disposed under the first connecting member 55a to the fourth connecting member 55d, respectively. The upper end of the first support 52a is connected to the lower end of the first connecting member 55a, the upper end of the second support 52b is connected to the lower end of the second connecting member 55c, the upper end of the third support 52c is connected to the lower end of the third connecting member 55c, and the upper end of the fourth support 52d is connected to the lower end of the fourth connecting member 55d to form the frame 50.

Then, the surface-like member configuring the first video display unit $15_{A1}$ is fixed to the first beam member 53a, and the surface-like member configuring the second video display unit $15_{A2}$ is fixed to the second beam member 53b. At this time, it is preferable for the first video display unit $15_{A1}$ and the second video display unit $15_{A2}$ to be fixed by preventing a gap from being generated therebetween as much as possible. Note that the surface-like member configuring the first video display unit $15_{A1}$ may be fixed to the first support 52a and the second support 52b, and the second video display unit $15_{A2}$ may be fixed to the second support 52b and the third support 52c.

Further, the first display device $14_{A1}$ is fitted and fixed to the beam member 53c along the X-Z plane, and the second display device $14_{A2}$ is fitted and fixed to the fourth beam member 53d along the Y-Z plane. At this time, the fixing position of the first display device $14_{A1}$ at the third beam member 53c may be a position at which videos can be projected on the entire surface of almost entire surface of the first video display unit $15_{A1}$. The first display device $14_{A1}$ may be fixed via a mounting tool for being loaded on the third beam member 53c. This is the same for the second display device $14_{A2}$ loaded on the fourth beam member 53d.

Further, the fixing positions of the first display device $14_A$ (the first display device $14_{A1}$ and the second display device $14_{A2}$) will be described in more details. The display device $14_A$ is set to project the videos captured in the second base site B by effectively using the video-projectable display face that is called the video display unit $15_A$. That is, on the video display unit $15_A$, the videos of the second base site B captured by the imaging device $10_B$ are displayed down to the lower end of the video display unit $15_A$. Also, on the video display unit $15_A$, the videos of the second base site B captured by the imaging device $10_B$ are displayed up to the upper end of the video display unit $15_A$. Furthermore, on the video display unit $15_A$, the videos of the second base site B captured by the imaging device $10_B$ are displayed to both ends in the width direction of the video display unit $15_A$.

Regarding the size of the first video display unit $15_{A1}$ and the second video display unit $15_{A2}$ in the embodiment, the width corresponds to the beam members 53 and the height corresponds to the height of the supports 52 (and the connecting members 55 added thereto). The videos captured in the second base site B (or videos on which prescribed video processing is performed) are to be projected by corresponding to such size. Thus, as shown in FIG. 7A, the first display device $14_{A1}$ is fitted and fixed at a position with which the video, when projected on the video display unit $15_{A1}$ from the mount position, can be projected at a video projection angle $\theta_{12}$ at which both ends in the width direction of the projected video coincides or almost coincides with both ends in the width direction of the video display unit $15_{A1}$. Also, as shown in FIG. 7B, the first display device $14_{A1}$ is fitted and fixed at a position $CH_1$ with which the video, when projected on the video display unit $15_{A1}$ from the mount position, can be projected at a video projection angle $\theta_{12}$ at which both ends in the height direction of the projected video coincides or almost coincides with both ends in the height direction of the video display unit $15_{A1}$. The position $CW_1$ is at the center part of the third beam member 53c so that the video from the first display device $14_{A1}$ can be projected equivalently on right and left and that the center line of the video projection angle $\theta_{11}$ forms a right angle with the first video display unit $15_{A1}$ on a plan view. Further, the position $CH_1$ in the height direction of the first display device $14_{A1}$ is set at the top face (the position corresponding to $CW_1$) of the third beam member 53c. The first display device $14_{A1}$, as shown in FIG. 7B, projects the video from a position on the upper side than the center of the first video display unit $15_{A1}$, so that it is fixed to be able to project the video at a video projection angle $\theta_{13}$ that is a downward direction with respect to a horizontal direction (shown with an alternate short and long dash line) passing through the position $CH_1$. In this manner, the positions $CW_1$, $CH_1$, and the angles $\theta_{11}$, $\theta_{12}$, $\theta_{13}$ are determined to place the first display device $14_{A1}$. The second display device $14_{A2}$ is also fitted and fixed (see FIG. 7A) to be able to project the video at a video projection angle $\theta_{21}$ like the projection angle $\theta_{11}$ of the first display device $14_{A1}$ and further to be able to project the video at a prescribed video projection angle like the projection angles $\theta_{12}$, $\theta_{13}$.

As shown in FIG. 5, the first imaging device $10_{A1}$ and the second imaging device $10_{A2}$ are disposed in the vicinity of the border between the first video display unit $15_{A1}$ and the second video display unit $15_{A2}$ (in the vicinity of the second support $52b$) as the center part of the video display unit $15_A$. There is no specific limit set for the method for disposing the first imaging device $10_{A1}$ and the second imaging device $10_2$. For example, those may be fixed to the second support $52b$ or may be disposed on another mount stand.

Referring to FIGS. 10A and 10B, capturing directions and layout of camera lenses $11_{A1}$ and $11_{A2}$ provided to the first imaging device $10_{A1}$ and the second imaging device $10_{A2}$, respectively, will be described. As shown in FIG. 10A, disposition of the first camera lens $11_{A1}$ in the horizontal direction is so set that the second video display unit $15_{A2}$ is not captured. Disposition of the second camera lens $11_{A2}$ in the horizontal direction is so set that the first video display unit $15_{A1}$ is not captured. Through disposing them in such manner, the first video display unit $15_{A1}$ and the second video display unit $15_{A2}$ in the first base site A are not displayed in the videos to be projected in the second base site B, and the lifelike and realistic videos can be provided to the second base site B.

In the meantime, for disposition of the first camera lens $11_{A1}$ and the second camera lens $11_{A2}$ in the vertical direction, the first imaging device $10_{A1}$ and the second imaging device $10_{A2}$ are disposed such that each of the optical axis $LA_1$ of the first camera lens $11_{A1}$ and the optical axis $LA_2$ of the second camera lens $11_{A2}$ is horizontal and the height of the optical axis $LA_1$ of the first camera lens $11_{A1}$ and that of the optical axis $LA_2$ of the second camera lens $11_{A2}$ coincide with each other. When the height of the optical axis $LA_1$ of the first camera lens $11_{A1}$ and that of the optical axis $LA_2$ of the second camera lens $11_{A2}$ do not coincide with each other, there is a vertical discrepancy generated between the video projected on the first video display unit $15_{B1}$ of the second base site B and the video projected on the second video display unit $15_{B2}$. Thus, it is necessary to prevent such discrepancy. Through adjusting the disposition height H1 of the first camera lens $11_{A1}$ and the second camera lens $11_{A2}$ between the height of average eyesight level of sitting human beings and the height of average eyesight level of standing human beings, for example, the videos projected in the second base site B can be viewed with an unartificial feeling. In the embodiment, lifelike and realistic videos can be captured through setting H1 about 1 meter from the floor face $F_A$. However, the height may be set as appropriate.

Through adjusting view angles of the first camera lens $11_{A1}$ so as not to capture the third beam member $53c$ and the first display device $14_{A1}$, those are not displayed on the videos projected in the second base site B. This makes it possible to provide the lifelike and realistic videos in the second base site B. The second camera lens $11_{A2}$ is also adjusted so as not to capture the fourth beam member $53d$ and the second display device $14_{A2}$.

Further, the view angles of the camera lens $11_A$ are adjusted so that the imaging device $10_A$ can capture and output videos of a prescribed space including at least the floor face $F_A$ of the first base site A. For example, as shown in FIG. 10B, the view angles of the first camera lens $11_{A1}$ and the second camera lens $11_{A2}$ are adjusted so that a part of the floor face $F_A$ (see P-point of FIG. 8B) in the inside space $S_A$ is captured. Specifically, the view angles of the first camera lens $11_{A1}$ and the second camera lens $11_{A2}$ are adjusted so as to be able to capture the feet of a subject standing in the vicinity of the third beam member $53c$ or the fourth beam member $53d$ and the floor face $F_A$ in the surrounding thereof within the inside space $S_A$. Through capturing the feet of the subject standing in the vicinity of the third beam member $53c$ or the fourth beam member $53d$ and the floor face $F_A$ in the surrounding thereof, continuity is generated between the spaces so that lifelike and realistic videos can be provided. Similarly, the view angles of the camera lens $11_A$ are adjusted so that the imaging device $10_A$ can capture and output videos of a prescribed space including at least the ceiling $C_A$ of the first base site A.

While described above is the case of disposing the first camera lens $11_{A1}$ and the second camera lens $11_{A2}$ in such a manner that each of the optical axis $L_{A1}$ of the first camera lens $11_{A1}$ and the optical axis $L_{A2}$ of the second camera lens $11_{A2}$ becomes horizontal, it is also possible to dispose each of the optical axis $L_{A1}$ of the first camera lens $11_{A1}$ and the optical axis $L_{A2}$ of the second camera lens $11_{A2}$ to face downward so that the third beam member $53c$ as well as the first display device $14_{A1}$ and the fourth beam member $53d$ as well as the second display device $14_{A2}$ are not captured (see FIG. 10A) and a part of the floor face $F_A$ (see the P-point of FIG. 10B) in the inside space $S_A$ is captured.

The place for disposing the sound collector $12_A$ is not specifically limited. It may be disposed as appropriate at a position where mainly the sounds in the inside space $S_A$ of the frame 50 can be collected.

The place for disposing the voice device $16_A$ is not specifically limited. It may be disposed as appropriate at a position where sounds ($V_B$) collected in the second base site can be heard clearly in the inside space $S_A$ of the frame 50.

The places for disposing the transmission unit $21_A$ and the reception unit $23_A$ shown in FIG. 11 are not specifically limited, as long as those are connected to each of the devices.

Figure 14A:
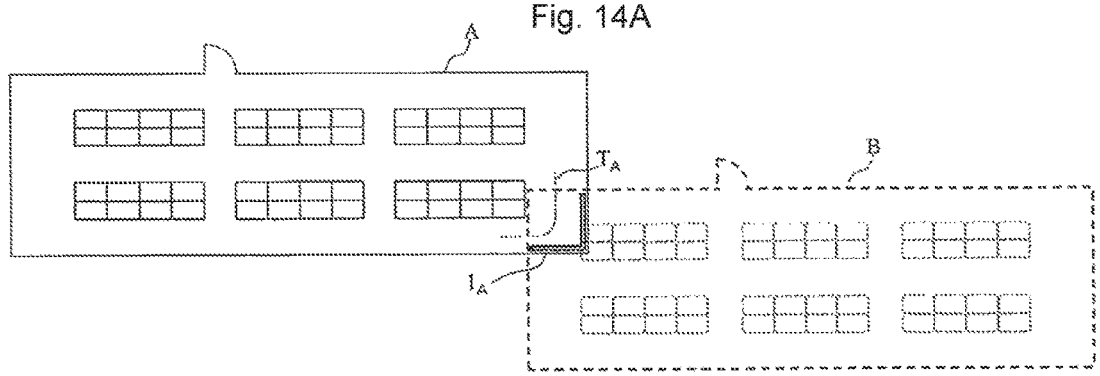
FIGS. 14A and 14B show flow lines along which the communication system according to the embodiment of the present invention is disposed in the first base site and the second base site.
Figure 14B:
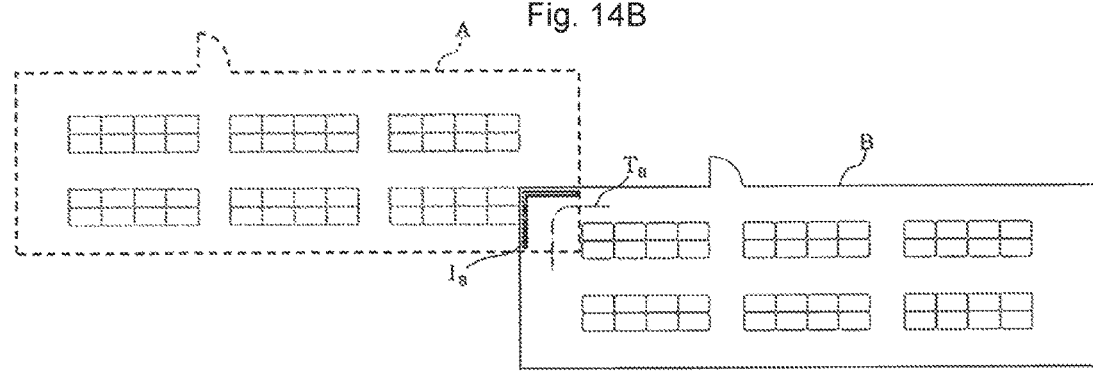

In the manner described above, the communication system $1_A$ is assembled in the first base site A. The communication system $1_B$ may be assembled in the second base site B in the same manner. When the communication system $1_A$ assembled in the first base site A is placed along the flow line $T_A$ set on the floor face $F_A$ in the lower-right corner part of the first base site A as shown in FIG. 14A, videos on which as if the space of the second base site B was spread as shown with a dotted line are to be displayed on the communication system $1_A$. Similarly, when the communication system $1_B$ assembled in the second base site B is placed along the flow line $T_B$ set on the floor face $F_B$ in the upper-right corner part of the second base site B as shown in FIG. 14B, videos on which as if the space of the first base site A was spread as shown with a dotted line are to be displayed on the communication system $1_B$.

Figure 15A:
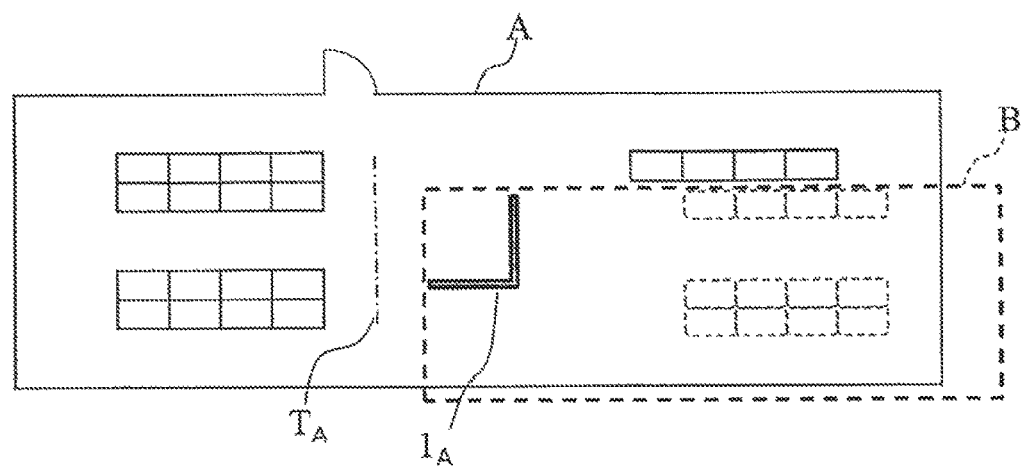
FIGS. 15A and 15B show flow lines along which the communication system according to the embodiment of the present invention is disposed in the first base site and the second base site.

Further, when the communication system $1_A$ assembled in the first base site A is placed along the flow line $T_A$ set on the floor face $F_A$ in the center part of the first base site A as shown in FIG. 15A, videos on which as if the space of the second base site B was spread as shown with a dotted line are to be displayed on the communication system $1_A$.

Figure 15B:
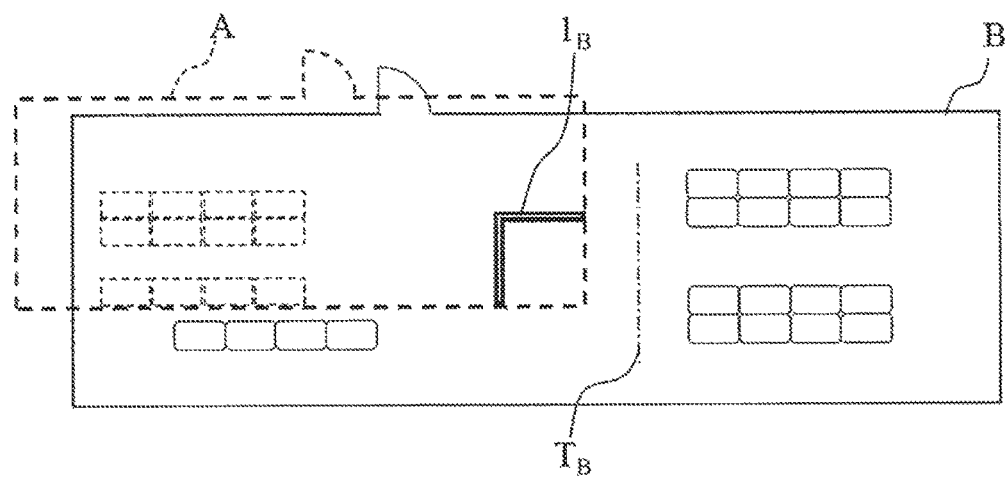

Similarly, when the communication system $1_B$ assembled in the second base site B is placed along the flow line $T_B$ set on the floor face $F_B$ in the center part of the second base site B as shown in FIG. 15B, videos on which as if the space of the first base site A was spread as shown with a dotted line are to be displayed on the communication system $1_B$.

(Actions and Processing of Communication System)

As shown in FIG. 1 and FIGS. 12A and 12B, the communication system $1_B$ to be disposed in the second base site B is configured with the imaging device $10_B$ (imaging devices $10_{B1}$, $10_{B2}$), the sound collector $12_B$, the display device $14_B$ ($14_{B1}$, $14_{B2}$), the video display unit $15_B$ ($15_{B1}$, $15_{B2}$), the voice device $16_B$, the transmission unit $21_B$, the reception unit $23_B$, and the frame 50 as in the case of the communication system $1_A$ described above. The communication system 1 enables communication between the first base site A and the second base site B (mainly offices, factories, and the like at distant places) through disposing the communication system $1_A$ in the first base site A and the communication system $1_B$ in the second base site B. Hereinafter, the communication system 1 will be described by referring to FIG. 11 and FIGS. 12A and 12B. FIGS. 12A and 12 B show data flows in the communication systems $1_A$ and $1_B$ shown in FIG. 4, in which FIG. 12A shows data transmission/reception from the first base site A to the second base site B and FIG. 12B shows data transmission/reception from the second base site B to the first base site A.

As shown in FIG. 11 and FIGS. 12A and 12B, through disposing the communication system $1_A$ in the first base site A and the communication system $1_B$ in the second base site B, respectively, and starting up each of the devices by an operation means, not shown, the transmission unit $21_A$, the reception unit $23_A$ of the communication system $1_A$ and the transmission unit $21_B$, the reception unit $23_B$ of the communication system $1_B$ are connected via the communication network 20. Further, the imaging device $10_A$ (141, $10_{A2}$) and the sound collector $12_A$ in the first base site A start to capture videos and collect sounds in a prescribed space of the first base site A, and the videos ($D_{A1}$, $D_{A2}$) and the sounds ($V_A$) outputted successively are sent out to the communication network 20 by the transmission unit $21_A$. The reception unit $23_B$ of the second base site B receives the videos ($D_{A1}$, $D_{A2}$) and the sounds ($V_A$) captured and collected in the first base site A, the display device $14_B$ ($14_{B1}$, $14_{B2}$) of the second base site B projects the videos ($D_{A1}$, $D_{A2}$) on the video display unit $15_B$ ($15_{B1}$, $15_{B2}$) in realtime, and the voice device $16_B$ generates the sounds ($V_A$). Furthermore, the imaging device $10_B$ ($10_{B1}$, $10_{B2}$) and the sound collector $12_B$ in the second base site B start to capture videos and collect sounds in a prescribed space of the second base site B, and the videos ($D_{B1}$, $D_{B2}$) and the sounds ($V_B$) outputted successively are sent out to the communication network 20 by the transmission unit $21_B$. The reception unit $23_A$ of the first base site A receives the videos ($D_{B1}$, $D_{B2}$) and the sounds ($V_B$) captured and collected in the second base site B, the display device $14_A$ ($14_{A1}$, $14_{A2}$) of the first base site A projects the videos ($D_{B1}$, $D_{B2}$) on the video display unit $15_A$ ($15_{A1}$, $15_{A2}$) and the voice device $16_A$ generates the sounds ($V_A$).

Now, described is the video processing executed in the first display device $14_{A1}$ and the second display device $14_{A2}$ when projecting the videos $D_{B1}$, $D_{B2}$ of the second base site B on the first video display unit $15_{A1}$ and the second video display unit $15_{A2}$ of the first base site A.

The communication system $1_A$ disposed in the first base site A projects the videos $D_{B1}$, $D_{B2}$ of the second base site B captured by the first imaging device $10_{B1}$ and the second imaging device $10_{B2}$ of the communication system $1_B$ disposed in the second base site B on the laterally-long video display unit $15_A$ configured with the first video display unit $15_{A1}$ and the second video display unit $15_{A2}$ as if the videos were a series of laterally-long videos. Thus, the video display unit $14_A$ in the first base site A executes the video processing for projecting the videos $D_{B1}$ and $D_{B2}$ received at the reception unit $23_A$ as if the videos were a series of laterally-long videos.

When the view angle of the first camera lens $11_{B1}$ of the first imaging device $10_{B1}$ and the view angle of the first camera lens $11_{B2}$ of the second imaging device $10_{B2}$ partially overlap with each other, the video capturing ranges thereof partially overlap with each other. As a result, a same capturing subject is caught in the video $D_{B1}$ captured by the first imaging device $10_{B1}$ and the video $D_{B2}$ captured by the second imaging device $10_{B2}$ (see FIG. 10A). Thus, the display device $14_A$ executes the first video processing for cutting the overlapped video part of the videos $D_{B1}$ and $D_{B2}$. For example, the first display device $14_{A1}$ may cut the part overlapped with the video $D_{B2}$ from the video $D_{B2}$, while the second display device $14_{A2}$ may cut the part overlapped with the video $D_{B1}$ from the video $D_{B2}$ while having the middle (corresponds to L in FIG. 10A) of the capturing direction of the first camera lens $11_{B2}$ (corresponds to $L_{A2}$ in FIG. 10A) and the capturing direction of the second camera lens $11_{B2}$ (corresponds to $L_{A2}$ in FIG. 10A) as the border.

Further, the first display device $14_{A1}$ projects the video $D_{B1}$ from an upper-side position than the center of the video display unit $15_{A1}$, so that the video projected on the video display unit $15_{A1}$ becomes distorted in a trapezoid form. In order to eliminate such distortion, the second video processing for correcting trapezoid distortion (keystone correction) is executed in order to present the video in a quadrilateral form along the display face of the first video display unit $15_{A1}$.

On the lower end side of the video display unit $15_A$, the video of a floor face $F_B$ of the second base site B is displayed out of the videos of the second base site B captured by the imaging device $10_B$. Thereby, with such an effect that, along with the fact that the upper end of the video display unit $15_A$ is close to or abuts against the floor face $F_B$ of the second base site B, as if the actual floor face $F_A$ of the first base site A and the floor face $F_B$ of the second base site B as the video displayed on the video display unit $15_A$ were continued and that as if the space of the first base site A where actually the viewers exist and the space of the second base site B displayed as the video were continued, the lifelike and realistic videos can be provided. Further, along with the fact that the videos of the second base site B captured by the imaging device $10_B$ are displayed down to the lower end of the video display unit $15_A$, there is no such blank space generated in the lower end side of the video display unit $15_A$ that videos are not displayed. Thus, a sense of continuity between the actual floor face $F_A$ of the first base site A and the floor face $F_B$ of the second base site B as the video displayed on the video display unit $15_A$ can be improved further. This makes it possible to provide more lifelike and realistic videos from which a feeling of watching a TV screen is eliminated.

On the upper end side of the video display unit $15_A$, the video of the ceiling $C_B$ of the second base site B is displayed out of the videos of the second base site B captured by the imaging device $10_B$. Thereby, with such an effect that, along with the fact that the upper end of the video display unit $15_A$ is close to or abuts against the ceiling $C_A$, as if the actual ceiling $C_A$ of the first base site A and the ceiling $C_B$ of the second base site B as the video displayed on the video display unit $15_A$ were continued and that as if the space of the first base site A where actually the viewers exist and the space of the second base site B displayed as the video were continued, the lifelike and realistic videos can be provided. Further, along with the fact that the videos of the second base site B captured by the imaging device $10_B$ are displayed up to the upper end of the video display unit $15_A$, a sense of continuity between the actual ceiling $C_A$ of the first base site A and the ceiling $C_B$ of the second base site B as the video displayed on the video display unit $15_A$ can be improved further. This makes it possible to provide more lifelike and realistic videos as if the floor faces and the ceilings were both continued, from which a feeling of watching a TV screen is eliminated.

Further, along with the fact that the video of the second base site B captured by the imaging device $10_B$ is displayed to both ends in the width direction of the video display unit $15_A$, there is no such blank part generated in both ends in the width direction of the video display unit $15_A$ that the videos are not displayed. Thus, a sense of continuity between the actual first base site A and the second base site B as the video displayed on the video display unit $15_A$ can be improved further. This makes it possible to provide more lifelike and realistic videos from which a feeling of watching a TV screen is eliminated.

Through continuously operating the communication system $1_A$ of the first base site A and the communication system $1_B$ of the second base site B, continuity between the spaces can be generated. Thereby, lifelike realistic videos can be provided, and smooth communication between those who are in the first base site A and those who are in the second base site B can be achieved at all times. Note that on/off and connection time and the like of the communication system $1_A$ and/or the communication system $1_B$ may be set as appropriate depending on purposes of the use and the like. For example, when used in the office as the first base site A and the office as the second base site B, it is preferable to operate the system at all times during the business hours of both offices in order to stimulate and induce communication.
(Place for Disposing Communication System)

The place for disposing the communication system $1_A$ in the first base site A and the place for disposing the communication system $1_B$ of the second base site B may be set as appropriate depending on the use of the communication system 1.

For example, assuming that the first base site A and the second base site B are offices of a company, the communication system $1_A$ and/or the communication system $1_B$ are disposed along flow lines (moving lines) where persons often go back and forth in each of the offices for allowing the staff member in the first base site A and the staff member in the second base site B to have communication easily. Through employing such layout positions, it is possible to communicate (speak) with the staff member accidentally passing through from the respective base sites naturally or to find the staff member standing and talking in the other base site and participate in the conversation, for example, even if there is no such plan as a meeting set in advance. This makes it possible to have communication with a sense of close distance as if the communication partner was in the same base site (right by side or right in front).

Further, the communication system $1_A$ (and/or the communication system $1_B$) is disposed in a corner part of an indoor space (room) as the first base site A (and/or the second base site B), for example. The corner part that is a corner of the indoor space (room) tends to become a dead space which is not used effectively and often left as a luggage space or the like. However, disposing the communication system $1_A$ (and/or the communication system $1_B$) in such place can improve the effective use of the floor, and such space can be easily accepted as the place for permanently setting the relatively large-sized communication system $1_A$ (and/or the communication system $1_B$).

Modification Example 1

Figure 13:
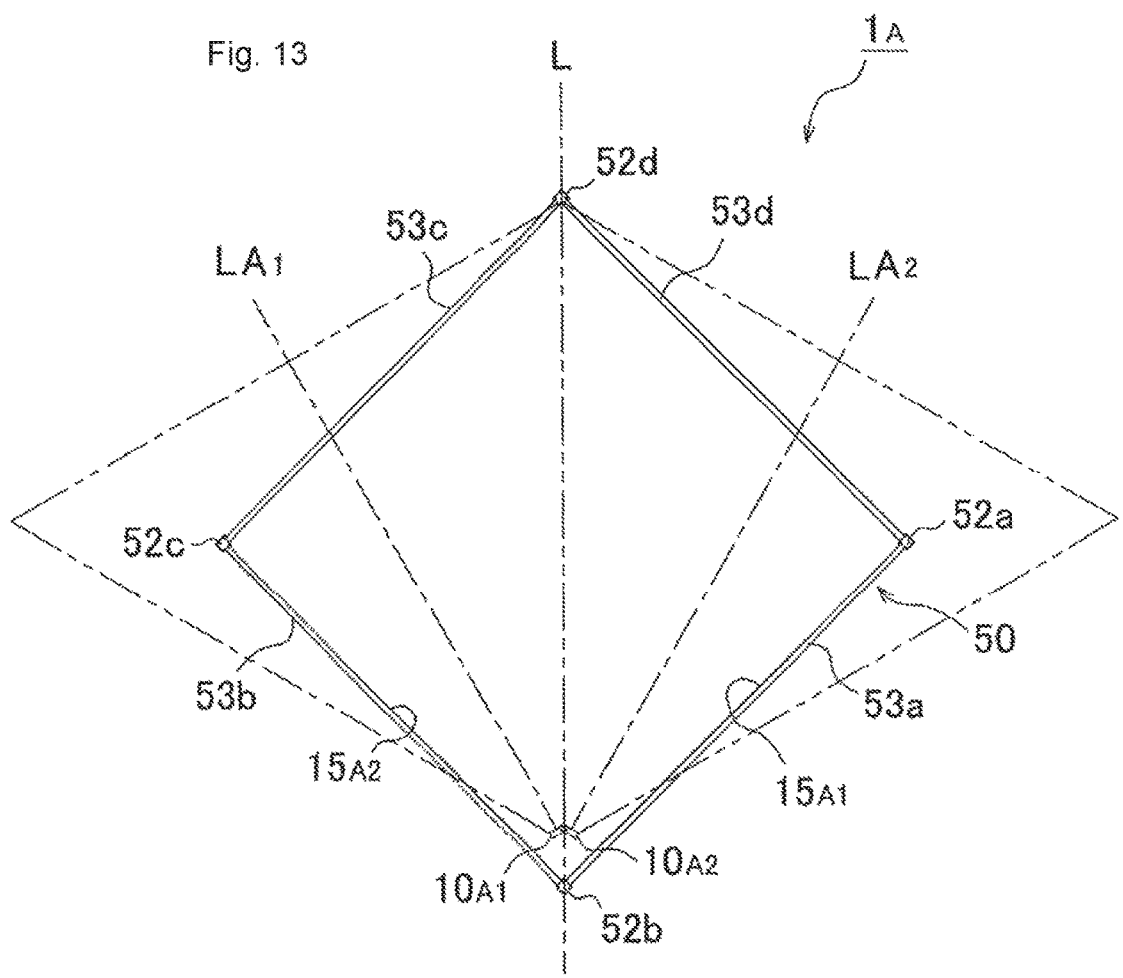
FIG. 13 is a view showing a modification example of capturing directions of the imaging device of the communication system according to the embodiment of the present invention.

Regarding the embodiment described above, the capturing directions of the imaging device $10_A$ ($10_{A1}$, $10_{A2}$) may be set in the manner shown in FIG. 13. FIG. 13 is a view showing the capturing directions of the imaging device $10_A$ of a modification example of the communication system $1_A$ shown in FIG. 4.

In the embodiment, described is the case where the layout position of the first camera lens $11_{A1}$ in the horizontal direction is so set that the second video display unit $15_{A2}$ is not captured and the layout position of the second camera lens $11_{A2}$ in the horizontal direction is so set that the first video display unit $15_{A1}$ is not captured. In Modification Example 1, however, the layout positions of the first camera lens $11_{A1}$ and the second camera lens $11_{A2}$ are so set that the end of the view angle of the first camera lens $11_{A1}$ and the end of the view angle of the second camera lens $11_{A2}$ coincide with each other at the border line L.

With such layout, the second video display unit $15_{A2}$ is caught in the video $D_{A1}$ that is captured by the first camera lens $11_{A1}$, and the first video display unit $15_{A1}$ is caught in the video $D_{A2}$ that is captured by the second camera lens $11_{A2}$. Thus, when such videos in that state are displayed in the second base site B, a lifelike feeling and reality are lost. Therefore, it is preferable to execute, by the display device $14_B$ of the second base site B, the video processing for cutting the part where the video display unit $15_A$ of the first base site A is caught from the videos $D_{A1}$ and $D_{A2}$.

More specifically, the first video display unit $14_{B1}$ of the second base site B executes the video processing for cutting the part where the first video display unit $15_{A1}$ of the first base site A is caught from the video $D_{A1}$ and projects the processed video on the first video display unit $15_{B1}$, and the second video display unit $14_{B2}$ executes the video processing for cutting the part where the second video display unit $15_{A2}$ of the first base site A is caught from the video $D_{A2}$ and projects the processed video on the second video display unit $15_{B2}$. Through executing such video processing, the first video display unit $15_{A1}$ and the second video display unit $15_{A2}$ of the first base site A are not to be caught in the videos displayed in the second base site B, thereby making it possible to provide the lifelike and realistic videos to the second base site B. Similarly, through executing the video processing on the videos $D_{B1}$ and $D_{B2}$ by the first display unit $14_{A1}$ and the second display unit $14_{A2}$, the first video display unit $15_{B1}$ and the second video display unit $15_{B2}$ of the second base site B are not to be caught in the videos displayed in the first base site A, thereby making it possible to provide the lifelike and realistic videos to the second base site B.

Modification Example 2

As described in the embodiment, regarding the view angles of the first camera lens $11_{A1}$ and the second camera lens $11_{A2}$, the view angle of the first camera lens $11_{A1}$ is so set that the third beam member 53c and the first display device $14_{A1}$ are not captured while the view angle of the second camera lens $11_{A1}$ is so set that the fourth beam member 53d and the second display device $14_{A2}$ are not captured (see FIGS. 10A and 10B). Also, as described above, the view angles may be so set that the end part of the view angle of the first camera lens $11_{A1}$ and the end part of the view angle of the second camera lens $11_{A2}$ coincide with each other at the border line L (see FIG. 13). This makes it possible to omit the video processing for cutting a prescribed part of the video $D_{A1}$ by the first display unit $14_{B1}$ of the second base site B and also to omit the video processing for cutting a prescribed part of the video $D_{A2}$ by the second display unit $14_{B2}$ of the second base site B. Therefore, it is preferable in respect that the video processing can be simplified.

Modification Example 3

In the embodiment above, the frame 50 is described by referring to the case of a square frame structure on a plan view. However, the shapes, the numbers, and the layout of the supports 52, the beam members 53, and the video unit (the display device $14_A$ and the video display unit 15) may be changed as appropriate depending on the place to be disposed, the purpose of use, and the like of the communication system 1. Modification examples thereof will be described hereinafter by referring to FIGS. 16A through 16F. FIGS. 16A through 16F show schematic plan views of the modification examples of the frame structure of the communication system 1 shown in FIG. 4.

Figure 16A:
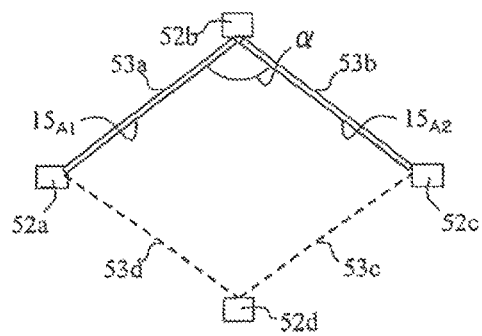
FIGS. 16A through 16F show schematic plan views of modification examples of frame structures of the communication system according to the embodiment of the present invention.

As shown in FIG. 16A, the four first to fourth beam members 53a to 53d may be assembled into a diamond-shaped frame structure. This is because a sense of immersion into the videos displayed on the video display units $15_A$ can be provided through configuring the video display unit $15_A$ to cover the viewing angles of the viewers who see the videos displayed on the video display unit $15_A$ even if the angle between the video display units $15_{A1}$ and $15_{A2}$ is not 90 degrees unlike the case of the embodiment described above.

Figure 16B:
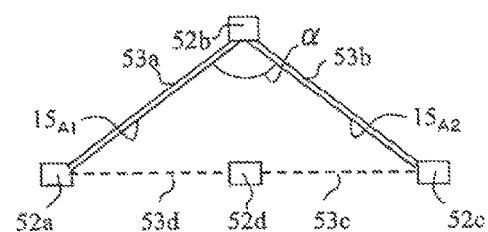

As shown in FIG. 16B, the four first to fourth beam members 53a to 53d may be assembled into a triangular frame structure on a plan view by assembling the third beam member 53c and the fourth beam member 53d to form a straight line among the first beam member 53a to the fourth beam member 53d. The first display device $14_{A1}$ may be set on the third beam member 53c and the second display device $14_{A2}$ on the fourth beam member 53d. Alternatively, when a digital display is used as the video unit (the video display units $15_{A1}$, $15_{A2}$), it is not necessary to provide the projector (the display devices $14_{A1}$, $14_{A2}$) on the third beam member 53c and the fourth beam member 53d. This makes it possible to reduce the layout area of the communication system 1.

Figure 16C:
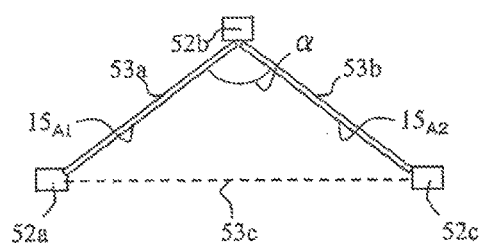

As shown in FIG. 16C, the fourth support 52d and the fourth beam member 53d may be omitted and the three first to third supports 52a to 52c and the three first to third beams 53a to 53c may be assembled into a triangular frame structure on a plan view. In such case, the first display device $14_{A1}$ and the second display device $14_{A2}$ may both be set on the third beam member 53c. Alternatively, when a digital display is used as the video unit (the video display units $15_{A1}$, $15_{A2}$), it is not necessary to provide the projector (the display devices $14_{A1}$, $14_{A2}$) on the third beam member 53c and the fourth beam member 53d. With such configuration, the fourth support 52d and the fourth beam member 53d become unnecessary. This makes it possible to reduce the layout area of the communication system 1 and to cut the cost by suppressing the number of components at the same time.

Figure 16D:
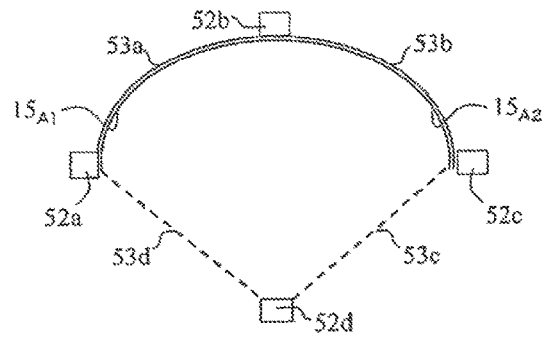

As shown in FIG. 16D, curved members may be used as the first beam member 53a and the second beam member 53b to form a frame structure assembled into a fan shape on a plan view. Through configuring the video display unit $15_A$ ($15_{A1}$, $15_{A2}$) with curved faces and disposed to cover the viewing angle on left and right of the viewers who see the videos displayed on the video display unit $15_A$, the viewers can acquire a sense of immersion.

Figure 16E:
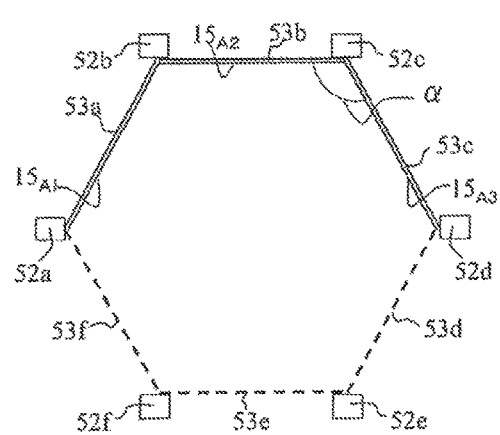

As shown in FIG. 16E, six supports 52 and six beam members 53 may be used to form a frame structure assembled into a hexagonal shape on a plan view. The frame 50 in a hexagonal shape on a plan view (angle α: 120 degrees, for example) may be formed, and videos projected from the three display devices $14_A$ ($14_{A1}$, $14_{A2}$, $14_{A3}$) may be displayed on the video display unit $15_A$ with three surfaces ($15_{A1}$, $15_{A2}$, $15_{A3}$). Through providing the video display unit $15_A$ with three connected surfaces, the viewing angles on left and right of the viewers who see the videos displayed on the video display unit $15_A$ can be covered further. Therefore, the viewers can acquire a sense of immersion for a wide range of videos. While the case of the frame 50 in a hexagonal shape on a plan view is described, a pentagonal-shaped frame on a plan view or other polygonal-shaped frames may be formed as well.

Figure 16F:
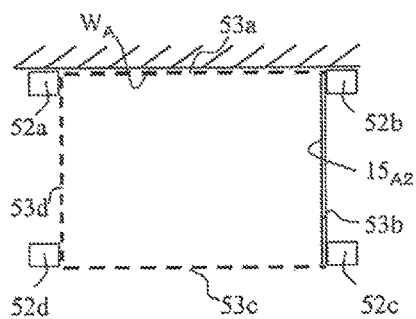

Further, as shown in FIG. 16F, there is a case where a part of the wall face $W_A$ of the first base site such as an office is used as the video display unit $15_{A1}$ and the display device $14_B$ projects the videos directly to the wall face $W_A$ by using the frame 50 described in the embodiment. Through placing the surface-like member configuring the video display unit $15_A$ adjacent to the wall face $W_A$, it becomes possible to provide lifelike, realistic, and immersive videos as in the case of the communication system 1 ($1_A$, $1_B$) of the embodiment described above. At the same time, it is possible to cut the cost by suppressing the number of components.

Other Modification Examples

While the case where the communication system $1_A$ disposed in the first base site A and the communication system $1_B$ disposed in the second base site B are in a same structure is described in the embodiment above, the communication system $1_A$ and the communication system $1_B$ may be formed to be in different structures depending on conditions such as places to be disposed, the purposes of use, and the like, since the environment of the first base site A where the communication system $1_A$ is disposed and the environment of the second base site B where the communication system $1_B$ is disposed may be different in some cases.

For example, in the communication system $1_A$ disposed in the first base site A, a lifelike feeling of the inside space $S_B$ of the second base site B can be experienced as long as it is in a structure in which the display device $14_A$ ($14_{A2}$, $14_{A2}$) projects the videos captured by the imaging device $10_B$ ($10_{B1}$, $10_{B2}$) disposed in the second base site B on the video display unit $15_A$ ($15_{A2}$, $15_{A2}$) and the voice device $16_A$ can produce the sound collected by the sound collector $12_B$ disposed in the second base site B. Therefore, the communication system $1_B$ may simply have the structures (the imaging device $10_B$ (imaging devices $10_{B1}$, $10_{B2}$) and the sound collector $12_B$) capable of transmitting at least the videos and sounds of the inside space $S_B$ of the second base site B.

Further, camera lenses of different view angles may be used for the camera lenses $11_{A1}$, $11_{A2}$ and for the camera lenses $11_{B1}$, $11_{B2}$. It is possible to employ a configuration in which sizes of the video display unit $15_A$ ($15_{A1}$, $15_{A2}$) and the video display unit $15_B$ ($15_{B1}$, $15_{B2}$) are different, and also possible to employ a configuration in which the angle α (see FIG. 4A) formed between the first video display unit $15_{A2}$ and the second video display unit $15_{A2}$ and the angle (not shown) formed between the first video display unit $15_{B1}$ and the second video display unit $15_{B2}$ are different. It is possible to form the first support 52a to the fourth support 52d of the first communication system $1_A$ in a different length from the length of the first support 52a to the fourth support 52d of the communication system $1_B$.

The present invention can be embodied in a number of types without departing from the essential characteristic thereof. It is therefore to be understood that the embodiment described above is only for description, and is not intended to limit the present invention.

The invention claimed is:

1. A communication system comprising:
   a plurality of different base sites communicably connected to each other, the plurality of different base sites including first and second base sites;
   a video display device disposed in the first base site, the video display device being configured to display a video image at a first area corresponding to a first flow line on a floor of the first base site, the first flow line corresponding to a first walking route in the first base site;
   an imaging device configured to capture the video image of a second area of the second base site, the second area corresponding to a second flow line on a floor of the second base site, the second flow line corresponding to a second walking route in the second base site; and
   a communication device configured to transmit the video image captured by the imaging device to the video display device,
   wherein the video display device is configured to display the video image at the first area, and
   the video image is displayed at the first area by linking the second flow line to the first flow line.

2. The communication system according to claim 1, wherein the video image captured by the imaging device includes movement of a person along the second flow line.

3. The communication system according to claim 1, wherein the first area of the first base site is formed with a planar member.

4. The communication system according to claim 1, wherein a lower end of the first area is placed close to or abutting against the floor of the first base site, and the video image of the floor of the second base site is displayed on a lower end of the first area.

5. The communication system according to claim 1, wherein the second area captured by the imaging device includes part of a ceiling of the second base site,
   an upper end of the first area is close to or abuts against a ceiling of the first base site, and
   the video image of the ceiling of the second base site is displayed on an upper end of the first area.

6. The communication system according to claim 5, wherein the first area is set at a height where a wall of the first base site is not caught in a view field of a viewer facing toward the first area, and
   the wall is located between the upper end of the first area and the ceiling of the first base site.

7. The communication system according to claim 1, wherein the first area is formed in a range covering a viewing angle of a viewer who sees the video image displayed on the first area.

8. The communication system according to claim 3, wherein the first area is configured as a combined planar member including of a plurality of the planar members,
   the combined planar member is located in an area from the first flow line of the first base site to a distal region from the first flow line of the first base site, and
   a life-size video image is displayed on a center region of the combined planar member.

9. The communication system according to claim 1, further comprising:
   an audio device which is configured to collect sounds of one of the first base site and the second base site and is configured to output the sounds to the other of the first base site and the second base site.

10. The communication system according to claim 1, wherein the imaging device is configured to successively capture the second area of the second base site,
    the communication device is configured to successively transmit the video image captured by the imaging device to the video display device, and
    the video display device is configured to successively display the video image at the first area of the first base site as the state information of the second base site.

11. A communication method for inducing communication between a plurality of different base sites including first and second base sites, the method comprising:
    setting a first flow line on a floor of the first base site corresponding to a first walking route in the first base site;
    setting a second flow line on a floor of the second base site corresponding to a second walking route in the second base site;
    capturing a video image of a first area of the second base site by using an imaging device, the first area corresponding to the second flow line;
    transmitting the video image captured by the imaging device to a video display device; and
    linking the second flow line to the first flow line so as to display the video image by the display device at a second area of the first base site corresponding to the first flow line.

12. The communication method according to claim 11, wherein the video image captured by the imaging device includes movement of a person along the second flow line.

13. The communication method according to claim 11, wherein the second area of the first base site is formed as a planar member.

* * * * *